(12) United States Patent
Fan et al.

(10) Patent No.: US 10,502,414 B2
(45) Date of Patent: *Dec. 10, 2019

(54) OXYGEN CARRYING MATERIALS

(71) Applicant: OHIO STATE INNOVATION FOUNDATION, Columbus, OH (US)

(72) Inventors: Liang-Shih Fan, Columbus, OH (US); Deepak Sridhar, Columbus, OH (US); Fanxing Li, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 193 days.

This patent is subject to a terminal disclaimer.

(21) Appl. No.: 15/685,951

(22) Filed: Aug. 24, 2017

(65) Prior Publication Data

US 2017/0370573 A1 Dec. 28, 2017

Related U.S. Application Data

(63) Continuation of application No. 14/116,627, filed as application No. PCT/US2012/037557 on May 11, 2012, now Pat. No. 9,777,920.

(Continued)

(51) Int. Cl.
*F23C 10/04* (2006.01)
*F23C 13/08* (2006.01)
*F23C 99/00* (2006.01)

(52) U.S. Cl.
CPC ............. *F23C 13/08* (2013.01); *F23C 10/04* (2013.01); *F23C 99/00* (2013.01); *F23C 2900/99008* (2013.01); *Y02E 20/346* (2013.01)

(58) Field of Classification Search
CPC ............................................... C10J 2300/1807
(Continued)

(56) References Cited

U.S. PATENT DOCUMENTS

| 971,206 A | 9/1910 | Messerschmitt |
| 1,078,686 A | 11/1913 | Lane |

(Continued)

FOREIGN PATENT DOCUMENTS

| CN | 1329761 | 1/2001 |
| CN | 1454711 | 11/2003 |

(Continued)

OTHER PUBLICATIONS

U.S. Pat. No. 9,376,318, 2015/0093577, filed Jun. 28, 2016, Fan et al.

(Continued)

*Primary Examiner* — Avinash A Savani
(74) *Attorney, Agent, or Firm* — Michael Best & Friedrich LLP

(57) ABSTRACT

In accordance with one embodiment of the present disclosure, an oxygen carrying material may include a primary active mass, a primary support material, and a secondary support material. The oxygen carrying material may include about 20% to about 70% by weight of the primary active mass, the primary active mass including a composition having a metal or metal oxide selected from the group consisting of Fe, Co, Ni, Cu, Mo, Mn, Sn, Ru, Rh, and combinations thereof. The oxygen carrying material may include about 5% to about 70% by weight of a primary support material. The oxygen carrying material may include about 1% to about 35% by mass of a secondary support material.

18 Claims, 6 Drawing Sheets

Related U.S. Application Data

(60) Provisional application No. 61/484,982, filed on May 11, 2011.

(58) Field of Classification Search
USPC .......................................................... 431/170
See application file for complete search history.

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 11/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 2,979,384 A | 4/1961 | Weiner et al. |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A * | 8/1970 | Bryce ................... H01B 1/00 252/514 |
| 3,573,224 A | 3/1971 | Strelzoff et al. |
| 3,619,142 A | 11/1971 | Johnson et al. |
| 3,726,966 A | 4/1973 | Johnston |
| 3,962,409 A | 6/1976 | Kotera et al. |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,155,832 A | 5/1979 | Cox et al. |
| 4,272,399 A | 6/1981 | Davis et al. |
| 4,318,711 A | 3/1982 | Smith |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,439,412 A | 3/1984 | Behie et al. |
| 4,521,117 A | 6/1985 | Ouwerkerk et al. |
| 4,594,140 A | 6/1986 | Cheng |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,895,821 A | 1/1990 | Kainer et al. |
| 4,902,586 A | 2/1990 | Wertheim |
| 5,130,106 A | 7/1992 | Koves et al. |
| 5,365,560 A | 11/1994 | Tam |
| 5,447,024 A | 9/1995 | Ishida et al. |
| 5,509,362 A | 4/1996 | Lyon |
| 5,518,187 A | 5/1996 | Bruno et al. |
| 5,529,599 A | 6/1996 | Calderon |
| 5,630,368 A | 5/1997 | Wagoner et al. |
| 5,730,763 A | 3/1998 | Manulescu et al. |
| 5,770,310 A | 6/1998 | Noguchi et al. |
| 5,827,496 A | 10/1998 | Lyon |
| 5,858,210 A | 1/1999 | Richardson |
| 6,007,699 A | 12/1999 | Cole |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,509,000 B1 | 1/2003 | Choudhary et al. |
| 6,517,631 B1 | 2/2003 | Bland |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,562,928 B2 | 10/2013 | Gupta |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 9,017,627 B2 | 4/2015 | Gupta |
| 9,290,386 B2 | 3/2016 | Wasas |
| 9,382,359 B2 | 7/2016 | Kanellopoulos et al. |
| 9,573,118 B2 | 2/2017 | Colozzi et al. |
| 2001/0055559 A1 | 12/2001 | Sanfilippo et al. |
| 2002/0011428 A1 | 1/2002 | Scheuerman |
| 2002/0179887 A1 | 12/2002 | Zeng et al. |
| 2003/0006026 A1 | 1/2003 | Matsumoto et al. |
| 2003/0024388 A1 | 2/2003 | Scharpf |
| 2003/0031291 A1 | 2/2003 | Yamamoto et al. |
| 2003/0119658 A1 | 6/2003 | Allison et al. |
| 2003/0130360 A1 | 7/2003 | Kindig et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |

(56) References Cited

U.S. PATENT DOCUMENTS

| | | | |
|---|---|---|---|
| 2008/0161624 A1 | 7/2008 | Glover et al. | |
| 2008/0164443 A1* | 7/2008 | White | B01J 23/002 252/373 |
| 2008/0209807 A1 | 9/2008 | Tsangaris et al. | |
| 2008/0314838 A1 | 12/2008 | Becker et al. | |
| 2009/0000194 A1 | 1/2009 | Fan et al. | |
| 2009/0042070 A1 | 2/2009 | Brown et al. | |
| 2009/0160461 A1 | 6/2009 | Zangl et al. | |
| 2010/0071262 A1 | 3/2010 | Robinson et al. | |
| 2010/0184589 A1 | 7/2010 | Miyairi et al. | |
| 2010/0187159 A1 | 7/2010 | Naunheimer | |
| 2010/0258429 A1 | 10/2010 | Ugolin | |
| 2010/0293845 A1 | 11/2010 | Zeman et al. | |
| 2010/0332170 A1 | 12/2010 | Gao et al. | |
| 2011/0005395 A1 | 1/2011 | Vimalchand et al. | |
| 2011/0011720 A1 | 1/2011 | Rinker | |
| 2011/0024687 A1 | 2/2011 | White et al. | |
| 2011/0054049 A1 | 3/2011 | Lambert et al. | |
| 2011/0094226 A1 | 4/2011 | McHugh et al. | |
| 2011/0100274 A1 | 5/2011 | Kuske et al. | |
| 2011/0146152 A1 | 6/2011 | Vimalchand et al. | |
| 2011/0176968 A1 | 7/2011 | Fan et al. | |
| 2011/0176988 A1 | 7/2011 | Okamura et al. | |
| 2011/0206469 A1 | 8/2011 | Furuyama et al. | |
| 2011/0289845 A1 | 12/2011 | Davis et al. | |
| 2011/0291051 A1 | 12/2011 | Hershkowitz et al. | |
| 2011/0300060 A1 | 12/2011 | Guillou et al. | |
| 2011/0303875 A1 | 12/2011 | Hoteit et al. | |
| 2012/0167585 A1 | 7/2012 | Wormser | |
| 2012/0171588 A1 | 7/2012 | Fan et al. | |
| 2012/0214106 A1 | 8/2012 | Sit et al. | |
| 2013/0085365 A1 | 4/2013 | Marashded et al. | |
| 2013/0149650 A1 | 6/2013 | Gauthier et al. | |
| 2013/0255272 A1 | 10/2013 | Ajhar et al. | |
| 2013/0261355 A1 | 10/2013 | Stamires | |
| 2014/0034134 A1 | 2/2014 | Fan et al. | |
| 2014/0072917 A1 | 3/2014 | Fan et al. | |
| 2014/0144082 A1 | 5/2014 | Fan et al. | |
| 2014/0275297 A1 | 9/2014 | Velazquez-Vargas et al. | |
| 2014/0295361 A1 | 10/2014 | Fan et al. | |
| 2015/0238915 A1 | 8/2015 | Fan et al. | |
| 2016/0002034 A1 | 1/2016 | Fan et al. | |
| 2016/0016800 A1 | 1/2016 | Noyes | |
| 2016/0023190 A1 | 1/2016 | Fan et al. | |
| 2016/0030904 A1 | 2/2016 | Fan et al. | |
| 2016/0268616 A1 | 9/2016 | Fan et al. | |
| 2016/0376512 A1 | 12/2016 | Fan et al. | |

FOREIGN PATENT DOCUMENTS

| | | |
|---|---|---|
| CN | 1501534 | 6/2004 |
| CN | 101389734 | 3/2009 |
| CN | 101426885 | 5/2009 |
| CN | 102187153 | 9/2011 |
| CN | 102612625 | 7/2012 |
| EP | 0161970 | 11/1985 |
| EP | 1134187 | 9/2001 |
| EP | 1445018 | 8/2004 |
| EP | 1580162 | 9/2005 |
| EP | 1845579 | 10/2007 |
| EP | 1933087 | 6/2008 |
| EP | 2450420 | 5/2012 |
| EP | 2515038 | 10/2012 |
| EP | 2601443 | 6/2013 |
| EP | 1976633 B1 | 3/2014 |
| FR | 2924035 | 5/2009 |
| JP | H10249153 | 9/1998 |
| JP | 2006-502957 | 1/2006 |
| TW | 406055 | 9/2000 |
| TW | 426728 | 3/2001 |
| WO | WO 1990/13773 | 11/1990 |
| WO | WO 1999/65097 | 12/1999 |
| WO | WO 2000/22690 | 4/2000 |
| WO | WO 2000/068339 | 11/2000 |
| WO | WO 2001/042132 | 6/2001 |
| WO | WO 2003/070629 | 8/2003 |
| WO | WO 2007/082089 | 7/2007 |
| WO | WO 2007/122498 | 11/2007 |
| WO | WO 2007/134075 | 11/2007 |
| WO | WO 2008/019079 | 2/2008 |
| WO | WO 2008/071215 | 6/2008 |
| WO | WO 2008/082312 | 7/2008 |
| WO | WO 2008/115076 | 9/2008 |
| WO | WO 2009/007200 | 1/2009 |
| WO | WO 2009/009388 | 1/2009 |
| WO | 2009/023515 A2 | 2/2009 |
| WO | WO 2009/021258 | 2/2009 |
| WO | WO 2009/114309 | 9/2009 |
| WO | WO 2010/037011 | 4/2010 |
| WO | WO 2010/063923 | 6/2010 |
| WO | WO 2010/126617 | 11/2010 |
| WO | WO 2011/021161 | 2/2011 |
| WO | WO 2011/031752 | 3/2011 |
| WO | WO 2011/031755 | 3/2011 |
| WO | WO 2011/084734 | 7/2011 |
| WO | WO 2012/064712 | 5/2012 |
| WO | WO 2012/077978 | 6/2012 |
| WO | WO 2012/155054 | 11/2012 |
| WO | WO 2012/155059 | 11/2012 |
| WO | WO 2013/040645 | 3/2013 |
| WO | WO 2014/085243 | 6/2014 |
| WO | WO 2011/153568 | 12/2014 |
| WO | WO 2014/195904 | 12/2014 |
| WO | WO 2016/053941 | 4/2016 |

OTHER PUBLICATIONS

U.S. Pat. No. 9,518,236, 2012/0159841, filed Dec. 13, 2016, Fan et al.

U.S. Pat. No. 9,616,403, 2016/0016137, filed Apr. 11, 2017, Fan et al.

Abad et al., "Chemical-looping combustion in a 300 W continuously operating reactor system using a manganese-based oxygen carrier," Fuel, 2006, vol. 85, Issue 9, pp. 1174-1185.

Abad et al., "Reduction Kinetics of CU-, Ni-, and Fe- Based Oxygen Carriers Using Syngas (CO + H2) for Chemical-Looping Combustion," Energy Fuels, 2007, 21 (4), pp. 1843-1853.

Abad et al., "The use of iron oxide as oxygen carrier in a chemical-looping reactor," Fuel, 2007, vol. 86, Issues 7-8, pp. 1021-1035.

Adanez et al., "Progress in Chemical-Looping Combustion and Reforming technologies," Progress in Energy and Combustion Science, 2012, vol. 38, Issue 2, pp. 215-282.

Adanez et al., "Selection of oxygen carriers for chemical-looping combustion," Energy & Fuels, American Chemical Society, 2004, vol. 18, No. 2, pp. 371-377.

Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.

Balasubramanian et al., "Hydrogen from methane in a single-step process," Chem Engr Science, 1999, 54(15-16), 3543.

Bell et al., "H2 Production via Ammonia Decomposition Using Non-Noble Metal Catalysts: A Review," Top Catal, 2016, 59, 1438-1457.

Cao et al., "Investigation of Chemical Looping Combustion by Solid Fuels. 1. Process Analysis," Energy Fuels, 2006, 20(5), pp. 1836-1844.

Cheng et al., "Carbon Dioxide Adsorption and Activation on Ceria (110): A density functional theory study," J. Chem. Phys. 2013, 138, 014702.

Cheng et al., "Methane Adsorption and Dissociation on Iron Oxide Oxygen Carrier: Role of Oxygen Vacancy," Phys. Chem. Chem. Phys. 2016, 18, 16423-16435.

Cheng et al., "Propagation of Olefin Metathesis to Propene on WO3 Catalysts: A Mechanistic and Kinetic Study," ACS Catal. 2015, 5, 59-72.

Cho et al., "Comparison of iron-, nickel-, copper- and manganese-based oxygen carriers for chemical-looping combustion," Fuel, 2004, vol. 83, Issue 9, pp. 1215-1225.

(56) References Cited

OTHER PUBLICATIONS

Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2012, pp. 1274-1281.
De Diego et al., "Development of Cu-based oxygen carriers for chemical-looping combustion," Fuel, 2004, vol. 83, Issue 13, pp. 1749-1757.
De Klerk, "Gas-to-Liquid Conversion" Natural Gas Conversion Technologies Workshop of ARPA-E. U.S. Department of Energy, Houston, TX. vol. 13 (2012).
Denton et al., "Simultaneous Production of High-Purity Hydrogen and Sequestration-Ready CO2 from Syngas," 2003.
EIA—Independent Statistics and Analysis. U.S. Department of Energy, U.S. Energy Information Administration "Annual Energy Outlook 2015 with Projections to 2040," Apr. 2015.
EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.
EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.
EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.
Environmental Protection Agency, "Geological CO2 Sequestration Technology and Cost Analysis," Technical Support Document, pp. i-vi & pp. 1-61, Jun. 2008.
Fan et al., "Chemical looping processes for CO2 capture and carbonaceous fuel conversion prospect and opportunity," Energy Environmental Science, 2012, p. 7254-7280.
Fan et al., "Utilization of chemical looping strategy in coal gasification processes," Particuology, 2008, vol. 6, Issue 3, pp. 131-142.
Fan et al., "Chemical-Looping Technology Platform," AIChE Journal, 61(1), 2-22 (2015).
Fan, "Chemical Looping Systems for Fossil Energy Conversions," Wiley-AIChE: Hoboken, NJ, U.S.A.; 2010.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Gao et al., "Production of syngas via autothermal reforming of methane in a fluidized-bed reactor over the combined $CeO_2$—$ZrO_2$/ $SiO_2$ supported Ni catalysts," International Journal of Hydrogen Energy, 2008, vol. 33, p. 5493-5500.
Garcia-Labiano et al., "Temperature variations in the oxygen carrier particles during their reduction and oxidation in a chemical-looping combustion system," Chemical Engineering Science, 2005, vol. 60, No. 3, pp. 851-862.
Geldart, "Types of Gas Fluidization," Power Technology, vol. 7, pp. 285-292, 1973.
Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.
Go et al., "Hydrogen production from two-step steam methane reforming in a fluidized bed reactor," International Journal of Hydrogen Energy, 2009, vol. 34, p. 1301-1309.
Haque, "Microwave energy for mineral treatment processes—a brief review," International Journal of Mineral Processing vol. 57, pp. 1-24, 1999.

Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.
Hildebrandt et al., "Producing Transportation Fuels with Less Work," Science, Mar. 27, 2009, vol. 323, pp. 1680-1681.
Hossain et al., "Chemical-looping combustion (CLC) for inherent CO2 separations—a review," Chemical Engineering Science, 2008, vol. 63, Issue 18, pp. 4433-4451.
Hua et al., "Three Dimensional Analysis of Electrical Capacitance Tomography Sensing Fields," 1999 IOP Publishing LTD, vol. 10, pp. 717-725.
Huijgen et al., "Carbon dioxide sequestration by mineral carbonation," ECN-C—03-016, www.ecn.nl/docs/library/report/200e/c03016.pdf, Feb. 2003.
Ishid A et al., "Evaluation of a Chemical-Looping-Combustion Power-Generation System by Graphic Exergy Analysis," Energy, 12(2), 147-154 (1987).
Jadha V et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.
Jin et al., "Development of a Novel Chemical-Looping Combustion: Synthesis of a Looping Material with a Double Metal Oxide of CoO-NiO," Energy & Fuels, 1998, vol. 12, 1272-1277.
Johansson et al., "Combustion of Syngas and Natural Gas in a 300 W Chemical-Looping Combustor," Chemical Engineering Research and Design Volume, 2006, vol. 84, Issue 9, pp. 819-827.
Kaiser et al., "Precombustion and Postcombustion Decarbonization," IEEE, Power Engineering Review, Apr. 2001, pp. 15-17.
Kathe et al., "Chemical Looping Gasification for Hydrogen Enhanced Syngas Production with in-situ CO2 Capture," United States Department of Energy, OSTI: 1185194, (2015).
Leion et al., "Solid fuels in chemical-looping combustion using oxide scale and unprocessed iron ore as oxygen carriers," Fuel, 2009, vol. 88, Issue 10, pp. 1945-1954.
Leion et al., "Solid fuels in chemical-looping combustion," International Journal of Greenhouse Gas Control, 2008, vol. 2, Issue 2, pp. 180-193.
Leion et al., "The use of petroleum coke as fuel in chemical-looping combustion," Fuel, 2007, vol. 86, Issue 12-13, pp. 1947-1958.
Li et al., "Clean coal conversion processes—progress and challenges," The Royal Society of Chemistry, Energy & Environmental Science, Jul. 30, 2008, vol. 1, pp. 248-267.
Li et al., "Ionic Diffusion in the Oxidation of Iron-effect of Support and Its Implications to Chemical Looping Applications," Energy Environ. Sci. 2011, 4, 876-880.
Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.
Li et al., "Syngas chemical looping gasification process: Bench-scale studies and reactor simulations," AICHE Journal, 2010, vol. 56, Issue 8, pp. 2186-2199.
Li et al., "Syngas Chemical Looping Gasification Process: Oxygen Carrier Particle Selection and Performance," Energy Fuels, 2009, 23(8), pp. 4182-4189.
Liu et al., "Enhanced Performance of Alkali Metal Doped Fe2O3 and Fe2O3/A1203 Composites as Oxygen Carrier Material in Chenical Looping Combustion," Energy Fuels. 2013, 27, 4977-4983.
Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).
Lyngfelt, "Chemical Looping Combustion of Solid Fuels—Status of Development," Applied Energy, 2014, vol. 113, p. 1869-1873.
Lyngfelt, "Oxygen Carriers for Chemical Looping Combustion Operational Experience," 1st International Conference on Chemical Looping, Mar. 2010.
Makepeace et al., "Ammonia decomposition catalysis using non-stoichiometric lithium imide," Chem. Sci., 2015, 6, 3805.

(56) References Cited

OTHER PUBLICATIONS

Mannan et al., "Simultaneous steam and CO2 reforming of methane to syngas over NiO/MgO/SA-5205 in presence and absence of oxygen," Applied Catalysis A, 1998, vol. 168, p. 33-46.
Marashdeh, Q. et al., "A Multimodal Tomography System Based on ECT Sensors," IEEE Sensors Journal, vol. 7, No. 3, 2007, 426-433.
Marashdeh, Q., Advances in Electrical Capacitance Tomography, Dissertation, The Ohio State University, 2006.
Mattisson et al., "Application of chemical-looping combustion with capture of CO2," Second Nordic Minisymposium on Carbon Dioxide Capture and Storage, Goeteborg, Oct. 26, 2001, pp. 46-51.
Mattisson et al., "Chemical-looping combustion using syngas as fuel," International Journal of Greenhouse Gas control, 2007, vol. 1, Issue 2, pp. 158-169.
Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.
Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.
Mattisson et al., "The use of iron oxide as an oxygen carrier in chemical-looping combustion of methane with inherent separation of CO2," Fuel, 2001, vol. 80, pp. 1953-1962.
Mattisson et al., "Use of Ores and Industrial Products as Oxygen Carriers in Chemical-Looping Combustion," Energy & Fuels, 2009, vol. 23, pp. 2307-2315.
Miller et al., "Toward Transformational Carbon Capture," AIChE Journal, 62, 1-10 (2016).
Netl, National Energy Technology Laboratory. U.S. Department of Energy, "Quality Guidelines for Energy System Studies—Specification for Selected Feedstocks." Jan. 2012.
Ockwig et al., "Membranes for Hydrogen Separation," American Chemical Society, Chem. Rev., Oct. 10, 2007, vol. 107, pp. 4078-4110.
O'Connor et al., "Carbon Dioxide Sequestration by Direct Mineral Carbonation: Results from Recent Studies and Currents Status," Abstract, USDOE Office of Fossil Energy, 2001.
Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).
Ortiz et al., "Hydrogen Production by Auto-Thermal Chemical-Looping Reforming in a Pressurized Fluidized Bed Reactor Using Ni-based Oxygen Carriers," International Journal of Hydrogen Energy, 2010, vol. 35, p. 151-160.
Park et al., "CO2 Mineral Sequestration: Chemically Enhanced Aqueous Carbonation of Serpentine," The Canadian Journal of Chemical Engineering, 2003, vol. 81, pp. 885-890.
Park et al., "CO2 Mineral Sequestration: physically activated dissolution of serpentine and pH swing process," Chemical Engineering Science, 2004, vol. 59, pp. 5241-5247.
Pröll et al., "Syngas and a separate nitrogen/argon stream via chemical looping reforming—A 140 kW pilot plant study," Fuel, 2010, vol. 89, Issue 6, pp. 1249-1256.
Qin et al., "Evolution of Nanoscale Morphology in Single and Binary Metal Oxide Microparticles During Reduction and Oxidation Processes," J. Mater. Chem. A. 2014, 2, 17511-17520.
Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.
Qin et al., "Nanostructure Formation Mechanism and Ion Diffusion in Iron-Titanium Composite Materials with Chemical Looping Redox Reactions," J. Mater. Chem. A. 2015, 3, 11302-11312.

Quin et al., "Improved Cyclic redox reactivity of lanthanum modified iron-based oxygen carriers in carbon monoxide xhemical looping combustion," Journal of Materials Chemistry A, 2017, 8 pages.
Ruchenstein et al., "Carbon dioxide reforming of methane over nickel/alkaline earth metal oxide catalysts," Applied Catalysis A, 1995, vol. 133, p. 149-161.
Russo et al., "Impact of Process Design of on the Multiplicity Behavior of a Jacketed Exothermic CSTR," AICHE Journal, Jan. 1995, vol. 41, No. 1, pp. 135-147.
Ryden et al., "Synthesis gas generation by chemical-looping reforming in a continuously operating laboratory reactor," Fuel, 2006, vol. 85, p. 1631-1641.
Scott et al., "In situ gasification of a solid fuel and CO2 separation using chemical looping" AICHE Journal, 2006, vol. 52, Issue 9, pp. 3325-3328.
Shen et al., "Chemical-Looping Combustion of Biomass in a 10kWth Reactor with Iron Oxide as an Oxygen Carrier," Energy & Fuels, 2009, vol. 23, pp. 2498-2505.
Shen et al., "Experiments on chemical looping combustion of coal with a NiO based oxygen carrier," Combustion and Flame, 2009, vol. 156, Issue 3, pp. 721-728.
Sridhar et al., "Syngas Chemical Looping Process: Design and Construction of a 25 kWth Subpilot Unit," Energy Fuels, 2012, 26(4), pp. 2292-2302.
Steinfeld et al., "Design Aspects of Solar Thermochemical Engineering—A case Study: Two-Step Water-Splitting Cycle Using the Fe3O4/FeO Redox System," Solar Energy, 1999, pp. 43-53.
Steinfeld, "Solar hydrogen production via a two-step water-splitting thermochemical cycle based on Zn/ZnO redox reactions," International Journal of Hydrogen Energy, 2002, vol. 27, pp. 611-619.
Tian et al., "Thermodynamic investigation into carbon deposition and sulfur evolution in a Ca-based chemical-looping combustion system," Chemical Engineering Research & Design, 2011, vol. 89, Issue 9, p. 1524.
U.S. Department of Energy, NCCTI Energy Technologies Group, Office of Fossil Energy, "CO2 Capture and Storage in Geologic Formations," pp. 34, Revised Jan. 8, 2002.
Usachev et al., "Conversion of Hydrocarbons to Synthesis Gas: Problems and Prospects," Petroleum Chemistry, 2011, vol. 51, p. 96-106.
Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.
Vernon et al., "Partial Oxidation of Methane to Synthesis Gas," Catalysis Letters, 1990, vol. 6, p. 181-186.
Warsito, W. et al., Electrical Capacitance Volume Tomography, 2007, pp. 1-9.
Yamazaki et al., "Development of highly stable nickel catalyst for methane-steam reaction under low steam to carbon ratio," Applied Catalyst A, 1996, vol. 136, p. 49-56.
Yin et. al., "A mini-review on ammonia decomposition catalysts for on-site generation of hydrogen for fuel cell applications," Applied Catalysis A: General, 2004, 277, 1-9.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
International Preliminary Report on Patentability for International Application PCT/US/2007/000956 dated Jul. 24, 2008.
International Preliminary Report on Patentability for International Application PCT/US/2010/048121 dated Mar. 22, 2012.
International Preliminary Report on Patentability for International Application PCT/US/2010/048125 dated Mar. 22, 2012.
International Preliminary Report on Patentability for International Application PCT/US/2011/059736 dated May 23, 2013.
International Preliminary Report on Patentability for International Application PCT/US/2012/037544 dated Nov. 12, 2013.
International Preliminary Report on Patentability for International Application PCT/US/2012/037557 dated Nov. 21, 2013.
International Search Report and Written Opinion for Application No. PCT/US14/14877 dated May 14, 2014 (10 pages).

(56) References Cited

OTHER PUBLICATIONS

International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2007/000956 dated Dec. 4, 2007.
International Search Report and Written Opinion for Application No. PCT/US2009/058579 dated Aug. 3, 2010.
International Search Report and Written Opinion for Application No. PCT/US2010/048121 dated Apr. 1, 2011.
International Search Report and Written Opinion for Application No. PCT/US2010/048125 dated Dec. 17, 2010.
International Search Report and Written Opinion for Application No. PCT/US2011/059736 dated Mar. 27, 2012.
International Search Report and Written Opinion for Application No. PCT/US2012/037544 dated Aug. 10, 2012.
International Search Report and Written Opinion for Application No. PCT/US2012/037557 dated Aug. 13, 2012.
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
International Search Report and Written Opinion for Application No. PCT/US2017/027241 dated Jul. 10, 2017 (11 pages).
International Search Report and Written Opinion for Application No. PCT/US2017/034503 dated Aug. 15, 2017 (14 pages).
Australian Patent Examination Report No. 1 for Application No. 2012253332 dated Apr. 22, 2016 (3 pages).
Office Action for Canadian Application No. 2,636,325 dated Dec. 5, 2012.
Chinese Patent Office Action for Application No. 201280031081.0 dated Jun. 3, 2015 (18 pages, English translation included).
Final Rejection for Chinese Patent Application No. 200780006757.X dated Feb. 1, 2013.
Office Action for Chinese Patent Application No. 200780006757.X dated Apr. 11, 2011.
Office Action for Chinese Patent Application No. 200780006757.X dated Dec. 8, 2011.
Office Action for Chinese Patent Application No. 200780006757.X dated Jul. 4, 2012.
Office Action for Chinese Patent Application No. 200980141285.8 dated Feb. 26, 2013.
Office Action for Chinese Patent Application No. 200980141285.8 dated Oct. 29, 2013.
Office Action for Chinese Patent Application No. 201080048130.2 dated Nov. 13, 2013.
Office Action for Chinese Patent Application No. 201080048173.0 dated Nov. 18, 2013.
Office Action for Chinese Patent Application No. 201110226206.2 dated May 14, 2013.
Office Action for Chinese Patent Application No. 201110226206.2 dated Sep. 18, 2013.
Office Action for Chinese Patent Application No. 201110226206.2 dated Sep. 5, 2012.
European Patent Office Extended Search Report for Application No. 12782066.0 dated Sep. 24, 2014 (7 pages).
European Search Report for Application No. 07716591.8 dated Mar. 6, 2012.
Office Action for Taiwanese Patent Application No. 098132745 dated Aug. 7, 2013.
Office Action for Taiwanese Patent Application No. 098132745 dated Oct. 17, 2012.
Advisory Action pertaining to U.S. Appl. No. 12/160,803 dated Jul. 11, 2013.
Advisory Action pertaining to U.S. Appl. No. 13/121,009 dated Jun. 24, 2013.
Examiner's Answer before the Patent Trial and Appeal Board for U.S. Appl. No. 12/160,803 dated Nov. 4, 2013.
Final Rejection pertaining to U.S. Appl. No. 12/160,803 dated Jan. 5, 2012.
Final Rejection pertaining to U.S. Appl. No. 12/160,803 dated Mar. 22, 2013.
Final Rejection pertaining to U.S. Appl. No. 13/121,009 dated Jan. 16, 2014.
Final Rejection pertaining to U.S. Appl. No. 13/121,009 dated Mar. 14, 2013.
Office Action pertaining to U.S. Appl. No. 12/160,803 dated Jun. 5, 2012.
Office Action pertaining to U.S. Appl. No. 12/160,803 dated Jun. 7, 2011.
United States Patent Office Action for U.S. Appl. No. 12/160,803 dated Feb. 23, 2016 (27 pages).
Office Action pertaining to U.S. Appl. No. 13/121,009 dated Sep. 13, 2013.
Office Action pertaining to U.S. Appl. No. 13/121,009 dated Sep. 6, 2012.
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 13/394,396 dated Jan. 15, 2016 (13 pages).
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 13/394,572 dated Oct. 13, 2015 (21 pages).
United States Patent Office Notice of Allowance for U.S. Appl. No. 13/394,572 dated Dec. 14, 2015 (10 pages).
United States Patent Office Notice of Allowance for U.S. Appl. No. 13/394,572 dated Feb. 22, 2016 (8 pages).
United States Patent Office Action for U.S. Appl. No. 14/091,654 dated Jun. 12, 2015 (16 pages).
United States Patent Office Action for U.S. Appl. No. 14/091,654 dated Oct. 30, 2014 (14 pages).
United States Patent Office Action for U.S. Appl. No. 14/091,654 dated Jan. 4, 2016 (17 pages).
United States Patent Office Notice of Allowance for U.S. Appl. No. 14/504,295 dated Sep. 28, 2015 (10 pages).
United States Patent Office Action for U.S. Appl. No. 15/162,199 dated Jun. 30, 2016 (10 pages).
United States Patent Office Final Rejection for U.S. Appl. No. 15/162,199 dated Oct. 21, 2016 (9 pages).
United States Patent Office Action for U.S. Appl. No. 13/883,795 dated Jun. 20, 2016 (15 pages).
United States Patent Office Action for U.S. Appl. No. 13/883,795 dated Jun. 23, 2017 (11 pages).
United States Patent Office Notice of Allowance for U.S. Appl. No. 13/394,396 dated Aug. 3, 2016 (8 pages).
United States Patent Office Action for U.S. Appl. No. 14/116,627 dated Oct. 20, 2016 (6 Pages).
United States Patent Office Notice of Allowance for U.S. Appl. No. 14/116,627 dated Mar. 10, 2017 (5 pages).
United States Patent Office Notice of Allowance for U.S. Appl. No. 14/116,627 dated Jun. 14, 2017 (5 pages).
United States Patent Office Final Rejection for U.S. Appl. No. 14/116,636 dated Oct. 24, 2016 (10 pages).
United States Patent Office Action for U.S. Appl. No. 14/766,086 dated Jan. 13, 2017 (22 pages).
United States Patent Office Action for U.S. Appl. No. 14/766,086 dated Sep. 7, 2017 (19 pages).
United States Patent Office Action for U.S. Appl. No. 14/775,044 dated May 30, 2017 (15 pages).
United States Patent Office Action for U.S. Appl. No. 14/634,319 dated Nov. 7, 2016 (7 pages).

(56) References Cited

OTHER PUBLICATIONS

United States Patent Office Action for U.S. Appl. No. 14/634,319 dated Apr. 11, 2017 (9 pages).
United States Patent Office Notice of Allowance for U.S. Appl. No. 14/774,730 dated Nov. 16, 2016 (10 pages).
United States Patent Office Notice of Allowance for U.S. Appl. No. 13/883,795 dated Jan. 22, 2018 (7 pages).
United States Patent Office Action for U.S. Appl. No. 14/766,086 dated Jan. 2, 2018 (21 pages).
United States Patent Office Action for U.S. Appl. No. 14/775,044 dated Feb. 26, 2018 (16 pages).
United States Patent Office Action for U.S. Appl. No. 15/191,249 dated Dec. 28, 2017 (14 pages).
United States Patent Office Action for U.S. Appl. No. 15/647,084 dated Dec. 26, 2017 (7 pages).
Forzatti, "Present status and perspectives in de-NOx SCR catalysis." Appl. Catal. A: Gen., 222(1-2), 2001, 221-236.
United States Environmental Protection Agency. "Air Pollution Control Technology Fact Sheet: Selective Catalytic Reforming," <https://www3.epa.gov/ttncatc1/cica/files/fscr.pdf> (2003).
Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.
Iwamoto et al., "Influence of sulfur dioxide on catalytic removal of nitric oxide over copper ion-exchanged ZSM-5 Zeolite." Appl. Catal., 69(2), 1991, 15-19.
Liu et al., "Recent Advances in Catalytic DeNOx Science and Technology," Catalysis Reviews, 48(1), 2006, 43-89.
Imanaka et al., "Advances in Direct NOx Decomposition Catalysts," Appl. Catal. A: Gen., 431-432, 2012, 1-8.
Masui et al.,"Direct Decomposition of NO into N2 and O2 Over C-type Cubic Y2O3—Tb4O7—ZrO2," Materials Sciences and Applications, 3(10), 2012, 733-738.
United States Patent Office Action for U.S. Appl. No. 15/376,590 dated Mar. 9, 2018 (10 pages).
Hung et al., "Zeolite ZSM-5 Supported Bimetallic Fe-Based Catalysts for Selective Catalytic Reduction of NO: Effects of Acidity and Metal Loading," Advanced Porous Materials, 2016, 4(3): 189-199(11).
Izquierdo et al., "Catalyst Deactivation and Regeneration Processes in Biogas Tri-Reforming Process. The Effect of Hydrogen Sulfide Addition," Catalysts, 2018, 8(12): 19 pages.
Kiuchi et al., "Recovery of hydrogen from hydrogen sulfide with metals or metal sulfides," Int. J. Hydrogen Energy, 1982, 7: 477-482.
Mao et al., "Facile synthesis of phase-pure FeCr2Se4 and FeCr2S4 nanocrystals via a wet chemistry method," J. Mater. Chem. C, 2014, 2: 3744-3749.
Netl, National Energy Technology Laboratory. U.S. Department of Energy, "Syngas Contaminant Removal and Conditioning," webpage accessed on Jul. 8, 2018.
Osha, "Hydrogen Sulfide in Workplaces," <https://www.osha.gov/SLTC/hydrogensulfide/hydrogensulfide_found.html> webpage accessed Jul. 8, 2018.
Sassi et al., "Sulfur Recovery from Acid Gas Using the Claus Process and High Temperature Air Combustion ( HiTAC ) Technology," Am. J. Environ. Sci., 2008, 4, 502-511.
Shick et al., "Single crystal growth of CoCr2S4 and FeCr2S4," Journal of Crystal Growth, 1969, 5(4): 313-314.
Thiollier et al., "Preparation and Catalytic Properties of Chromium-Containing Mixed Sulfides," Journal of Catalysis, 2011, 197(1): 58-67.
Wang et al., Study of bimetallic interactions and promoter effects of FeZn, FeMn and FeCr Fischer—Tropsch synthesis catalysts, Journal of Molecular Catalysis A: Chemical, 2010, 326:29-40.
Watanabe, "Electrical properties of FeCr2S4 and CoCr2S4," Solid State Communications, 1973, 12(5): 355-358.
International Search Report and Written Opinion for Application No. PCT/US2018/044530 dated Oct. 17, 2018 (13 pages).
United States Patent Office Notice of Allowance for U.S. Appl. No. 14/766,086 dated Aug. 8, 2018 (9 pages).
United States Patent Office Action for U.S. Appl. No. 15/376,590 dated Oct. 19, 2018 (8 pages).
United States Patent Office Notice of Allowance for U.S. Appl. No. 15/376,590 dated Jan. 9, 2019 (6 pages).
Rostrup-Nielsen, "Syngas in Perspective," Catalysis Today, 2002, 71(3-4), 243-247.
Takanabe, "Catalytic Conversion of Methane: Carbon Dioxide Reforming and Oxidative Coupling," Journal of the Japan Petroleum Institute, 2012, 55, 1-12.
Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, PA (2013).
Canadian Patent Office Action for Application No. 2,835,421 dated Jun. 11, 2018 (4 pages).
United States Patent Office Notice of Allowance for U.S. Appl. No. 15/647,084 dated Mar. 19, 2018 (8 pages).
United States Patent Office Notice of Allowance for U.S. Appl. No. 15/191,249 dated May 22, 2018 (8 pages).
United States Patent Office Notice of Allowance for U.S. Appl. No. 14/116,636 dated Nov. 7, 2017 (5 pages).
United States Patent Office Action for U.S. Appl. No. 14/774,727 dated Sep. 14, 2017 (10 pages).
Carrero et al., "A critical literature review of the kinetics for the oxidative dehydrogenation of propane over well-defined supported vanadium oxide catalysts," ACS Catalysis, 2014, 4: 3357-3380.
Cavani et al., "Oxidative dehydrogenation of ethane and propane: How far from commercial implementation?" Catalysis Today, 2007, 127(1): 113-131.
Koulialias et al., "Ordered defects in Fe 1-x S generate additional magnetic anisotropy symmetries," Journal of Applied Physics, 2018, 123(3): 033902, 10 pages.
Moreira, "Steam Cracking: Kinetics and Feed Characterization," Dissertation, 2015, 10 pages.
Wang et al., "Highly efficient metal sulfide catalysts for selective dehydrogenation of isobutane to isobutene," ACS Catalysis, 2014, 4: 1139-1143.
United States Patent Office Action for U.S. Appl. No. 16/166,746 dated May 1, 2019 (9 pages).
Sattler et al., "Catalytic Dehydrogenation of Light Alkanes on Metals and Metal Oxides," Chem Rev, 2014, 114(20): 10613-10653.
United States Patent Office Notice of Allowance for U.S. Appl. No. 16/166,746 dated Aug. 15, 2019 (8 pages).

\* cited by examiner

OXYGEN CARRYING MATERIALS

CROSS-REFERENCE TO RELATED APPLICATION(S)

This is a continuation of U.S. patent application Ser. No. 14/116,627, filed on Jun. 18, 2014, which is a U.S. national stage entry of International Patent Application No. PCT/US2012/037557, filed on May 11, 2012, which claims priority to U.S. Provisional Patent Application No. 61/484,982, filed on May 11, 2011, the entire contents of all of which are fully incorporated herein by reference.

The present invention relates to oxygen carrying materials, and specifically to oxygen carrying materials that are associated with chemical looping systems.

There is a constant need for clean and efficient energy generation systems. Most of the commercial processes that generate energy carriers such as steam, hydrogen, synthesis gas (syngas), liquid fuels and/or electricity are based on fossil fuels. Furthermore, the dependence on fossil fuels is expected to continue in the foreseeable future due to the lower costs compared to renewable sources. Currently, the conversion of carbonaceous fuels such as coal, natural gas, and petroleum coke is usually conducted through a combustion or reforming process. However, combustion of carbonaceous fuels, especially coal, is a carbon intensive process that emits large quantities of carbon dioxide to the environment. Sulfur and nitrogen compounds are also generated in this process due to the complex content in coal.

Traditionally the chemical energy stored inside coal has been utilized by combustion with $O_2$, with $CO_2$ and $H_2O$ as products. Similar reactions can be carried out if instead of oxygen, an oxygen carrying material is used in a chemical looping process. For example, metal oxides such as $Fe_2O_3$ can act as suitable oxygen carrying materials. However, unlike combustion of fuel with air, there is a relatively pure sequestration ready $CO_2$ stream produced on combustion with metal oxide carriers. The reduced form of metal oxide may then be reacted with air to liberate heat to produce electricity or reacted with steam to form a relatively pure stream of hydrogen, which can then be used for a variety of purposes.

Chemical reactions between metal oxides and carbonaceous fuels, on the other hand, may provide a better way to recover the energy stored in the fuels. Several processes are based on the reaction of metal oxide particles with carbonaceous fuels to produce useful energy carriers. For example, Ishida et al. (U.S. Pat. No. 5,447,024) describes processes wherein nickel oxide particles are used to convert natural gas through a chemical looping process into heat, which may be used in a turbine. However, recyclability of pure metal oxides is poor and constitutes an impediment for its use in commercial and industrial processes. Moreover, this technology has limited applicability, because it can only convert natural gas, which is more costly than other fossil fuels. Another well known process is a steam-iron process, wherein coal derived producer gas is reacted with iron oxide particles in a fluidized bed reactor to be later regenerated with steam to produce hydrogen gas. This process however suffers from poor gas conversion rates due to improper contact between reacting solids and gases, and is incapable of producing a hydrogen rich stream.

One of the problems with the prior art in combustion looping systems has been the metal/metal oxide oxygen carrying material. For example, iron in the form of small particles may degrade and break up in the reactor. Iron oxide has little mechanical strength as well. After only a few redox cycles, the activity and oxygen carrying capacity of the metal/metal oxide may decline considerably. Replacing the oxygen carrying material with additional fresh metal/metal oxide makes the process more costly.

As demands increase for cleaner and more efficient systems of converting fuel, the need arises for improved systems, and system components therein, which will convert fuel effectively, while reducing pollutants.

The concepts of the present disclosure are generally applicable to oxygen carrying materials. In accordance with one embodiment of the present disclosure, an oxygen carrying material may comprise a primary active mass, a primary support material, and a secondary support material. The oxygen carrying material may comprise about 20% to about 70% by weight of the primary active mass, the primary active mass comprising a composition having a metal or metal oxide selected from the group consisting of Fe, Co, Ni, Cu, Mo, Mn, Sn, Ru, Rh, and combinations thereof. The oxygen carrying material may comprise about 5% to about 70% by weight of a primary support material. The primary support material may comprise a composition having at least one metal, metal oxide, metal carbide, metal nitrate, metal halide, or combinations thereof; at least one ceramic or clay material, or salts thereof; at least one naturally occurring ore; or combinations thereof. The oxygen carrying material may comprise about 1% to about 35% by mass of a secondary support material. The secondary support material may comprise a composition having at least one metal, metal oxide, metal carbide, metal nitrate, metal halide, or combinations thereof; at least one ceramic or clay material or salts thereof; at least one naturally occurring ore; or combinations thereof. The primary support material composition and the secondary support material composition may be different.

In accordance with another embodiment of the present disclosure, a system for converting fuel may comprise an oxygen carrying material, a first reactor comprising a moving bed and an inlet for providing fuel to the first reactor, wherein the first reactor is configured to reduce the oxygen carrying material with the fuel to produce a reduced oxygen carrying material, and a second reactor communicating with the first reactor and an oxygen source, wherein the second reactor is configured to regenerate the oxygen carrying material by oxidizing the oxygen carrying material.

In accordance with another embodiment of the present disclosure, a method for synthesizing an oxygen carrying material may include forming a matrix comprising a primary active mass, a primary support, and a secondary support; drying the matrix; and forming the matrix into particles of the oxygen carrying material.

The following detailed description of specific embodiments of the present disclosure can be best understood when read in conjunction with the following drawings, where like structure is indicated with like reference numerals and in which.

Generally, the present disclosure is directed to oxygen carrying materials for use in systems for converting fuel by redox reactions of oxygen carrying material particles. In some embodiments, a reactor system may utilize a chemical looping process wherein carbonaceous fuels may be converted to heat, power, chemicals, liquid fuels, and/or hydrogen ($H_2$). In the process of converting carbonaceous fuels, oxygen carrying materials within the system such as oxygen carrying particles may undergo reduction/oxidation cycles. The carbonaceous fuels may reduce the oxygen carrying materials in a reduction reactor. The reduced oxygen carrying materials may then be oxidized by steam and/or air in one or more separate reactors. In some embodiments, oxides of iron may be preferred as at least one of the components in the oxygen carrying materials in the chemical looping system. In some embodiments, oxides of copper, cobalt and manganese may also be utilized in the system.

While various systems for converting fuel in which an oxygen carrying materials may be utilized are described herein, it should be understood that the oxygen carrying materials described herein may be used in a wide variety of fuel conversion systems, such as those disclosed herein as well as others. It should also be understood that the oxygen carrying materials described herein may be used in any system which may utilize an oxygen carrying material. It should further be understood that while several fuel conversion systems that utilize an iron containing oxygen carrying material are described herein, the oxygen carrying material need not contain iron, and the reaction mechanisms described herein in the context of an iron containing oxygen carrying material may be illustrative to describe the oxidation states of oxygen carrying materials that do not contain iron throughout the fuel conversion process.

Figure 1:
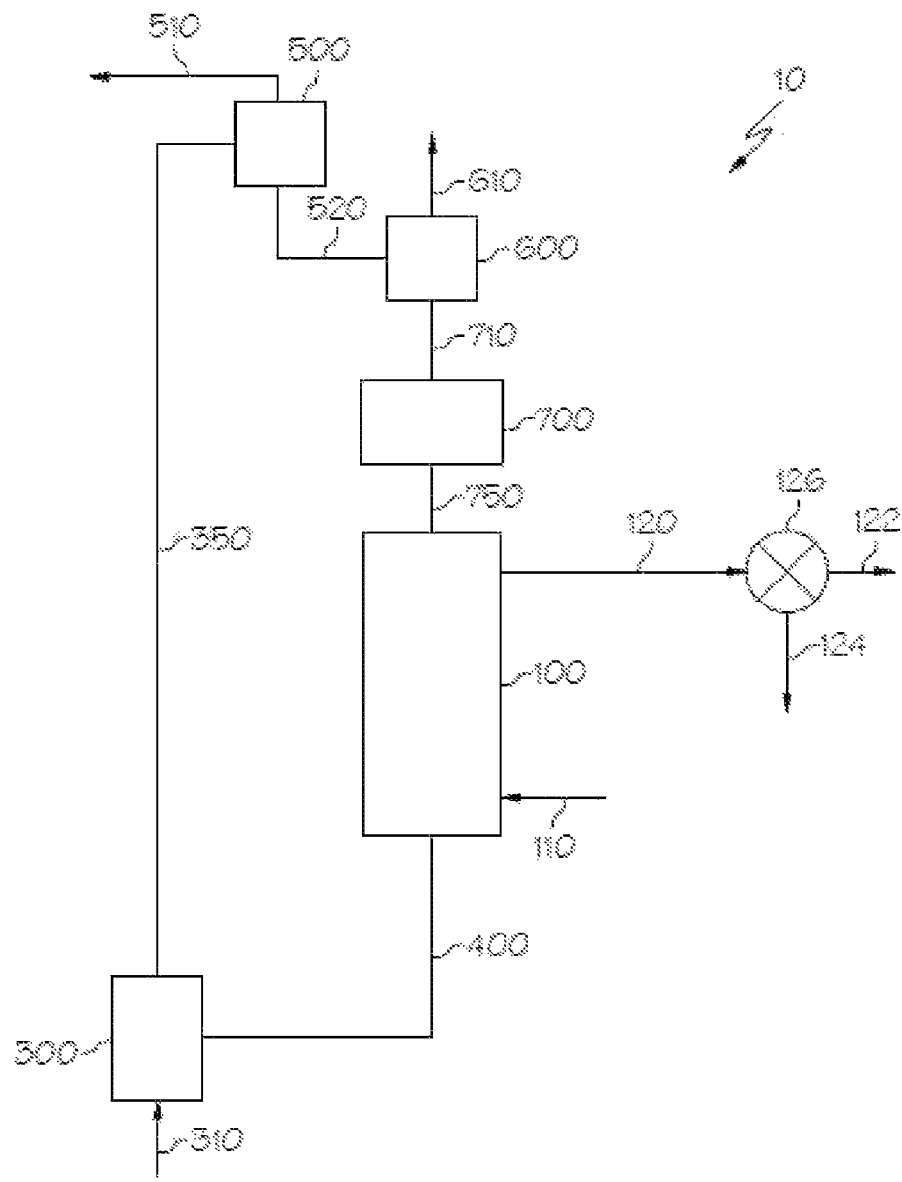
FIG. 1 is a schematic illustration of a system for converting fuel according to one or more embodiments of the present invention.

Now referring to FIG. 1, embodiments of the systems described herein may be directed to a specific configuration wherein heat and/or power may be produced from solid carbonaceous fuels. In such a fuel conversion system 10, a reduction reactor 100 may be used to convert the carbonaceous fuels from an inlet stream 110 into a $CO_2/H_2O$ rich gas in an outlet stream 120 using oxygen carrying materials. Oxygen carrying materials that enter the reduction reactor 100 from the solids storage vessel 700 through connection means 750 may contain oxides of iron with an iron valence state of 3+. Following reactions which take place in the reduction reactor 100, the metal such as Fe in the oxygen carrying material may be reduced to an average valence state between about 0 and 3+.

The oxygen carrying materials may be fed to the reactor via any suitable solids delivery device/mechanism. These solid delivery devices may include, but are not limited to, pneumatic devices, conveyors, lock hoppers, or the like.

The reduction reactor 100 generally may receive a fuel, which is utilized to reduce at least one metal oxide of the oxygen carrying material to produce a reduced metal or a reduced metal oxide. As defined herein, "fuel" may include: a solid carbonaceous composition such as coal, tars, oil shales, oil sands, tar sand, biomass, wax, coke etc; a liquid carbonaceous composition such as gasoline, oil, petroleum, diesel, jet fuel, ethanol etc; and a gaseous composition such as syngas, carbon monoxide, hydrogen, methane, gaseous hydrocarbon gases (C1-C6), hydrocarbon vapors, etc. For example, and not by way of limitation, the following equation illustrates possible reduction reactions:

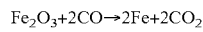

$$Fe_2O_3 + 2CO \rightarrow 2Fe + 2CO_2$$

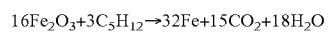

$$16Fe_2O_3 + 3C_5H_{12} \rightarrow 32Fe + 15CO_2 + 18H_2O$$

In this example, the metal oxide of the oxygen carrying material, $Fe_2O_3$, is reduced by a fuel, for example, CO, to produce a reduced metal oxide, Fe. Although Fe may be the predominant reduced composition produced in the reduction reaction of the reduction reactor 100, FeO or other reduced metal oxides with a higher oxidation state are also contemplated herein.

The reduction reactor 100 may be configured as a moving bed reactor, a series of fluidized bed reactors, a rotary kiln, a fixed bed reactor, combinations thereof, or others known to one of ordinary skill in the art. Typically, the reduction reactor 100 may operate at a temperature in the range of about 400° C. to about 1200° C. and a pressure in the range of about 1 atm to about 150 atm; however, temperatures and pressures outside these ranges may be desirable depending on the reaction mechanism and the components of the reaction mechanism.

The $CO_2/H_2O$ rich gas of the outlet stream 120 may be further separated by a condenser 126 to produce a $CO_2$ rich gas stream 122 and an $H_2O$ rich stream 124. The $CO_2$ rich gas stream 122 may be further compressed for sequestration. The reduction reactor 100 may be specially designed for solids and/or gas handling, which is discussed herein. In some embodiments, the reduction reactor 100 may be configured as a packed moving bed reactor. In another embodiment, the reduction reactor may be configured as a series of interconnected fluidized bed reactors, wherein oxygen carrying material may flow counter-currently with respect to a gaseous species.

Still referring to FIG. 1, the reduced oxygen carrying materials exiting the reduction reactor 100 may flow through a combustion reactor inlet stream 400 and may be transferred to a combustion reactor 300. The reduced oxygen carrying material in the combustion reactor inlet stream 400 may be moved through a non-mechanical gas seal and/or a non-mechanical solids flow rate control device.

To regenerate the metal oxide of the oxygen carrying materials, the system 10 may utilize a combustion reactor 300, which is configured to oxidize the reduced metal oxide. The oxygen carrying material may enter the combustion reactor 300 and may be fluidized with air or another oxidizing gas from an inlet stream 310. The iron in the oxygen carrying material may be re-oxidized by air in the combustion reactor 300 to an average valence state of about 3+. The combustion reactor 300 may release heat during the oxidation of oxygen carrying material particles. Such heat may be extracted for steam and/or power generation. In some embodiments, the combustion reactor 300 may comprise an air filled line or tube used to oxidize the metal oxide. Alternatively, the combustion reactor 300 may be a heat recovery unit such as a reaction vessel or other reaction tank.

The following equation lists one possible mechanism for the oxidation in the combustion reactor 300:

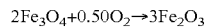

$$2Fe_3O_4 + 0.5O_2 \rightarrow 3Fe_2O_3$$

Following the oxidation reaction in the combustion reactor 300, the oxidized oxygen carrying materials may be transferred to a gas-solid separation device 500. The gas-solid separation device 500 may separate gas and fine particulates in an outlet stream 510 from the bulk oxygen carrying material solids in an outlet stream 520. The oxygen carrying material may be transported from the combustion reactor 300 to the gas-solid separation device 500 through solid conveying system 350, such as for example a riser. In one embodiment, the oxygen carrying material may be oxidized to $Fe_2O_3$ in the solid conveying system 350.

The bulk oxygen carrying material solids discharged from the gas-solid separation device 500 may be moved through a solids separation device 600, through connection means 710, and to a solids storage vessel 700 where substantially no reaction is carried out. In the solids separation device 600, oxygen carrying materials may be separated from other solids, which flow out of the system through an outlet 610. The oxygen carrying material solids discharged from the solids storage vessel 700 may pass through a connection means 750 which may include another non-mechanical gas sealing device and finally return to the reduction reactor 100 to complete a global solids circulation loop.

In some embodiments, the oxygen carrying material particles may undergo numerous regeneration cycles, for example, 10 or more regeneration cycles, and even greater than 100 regeneration cycles, without substantially losing functionality. This system may be used with existing systems involving minimal design change.

Figure 2:
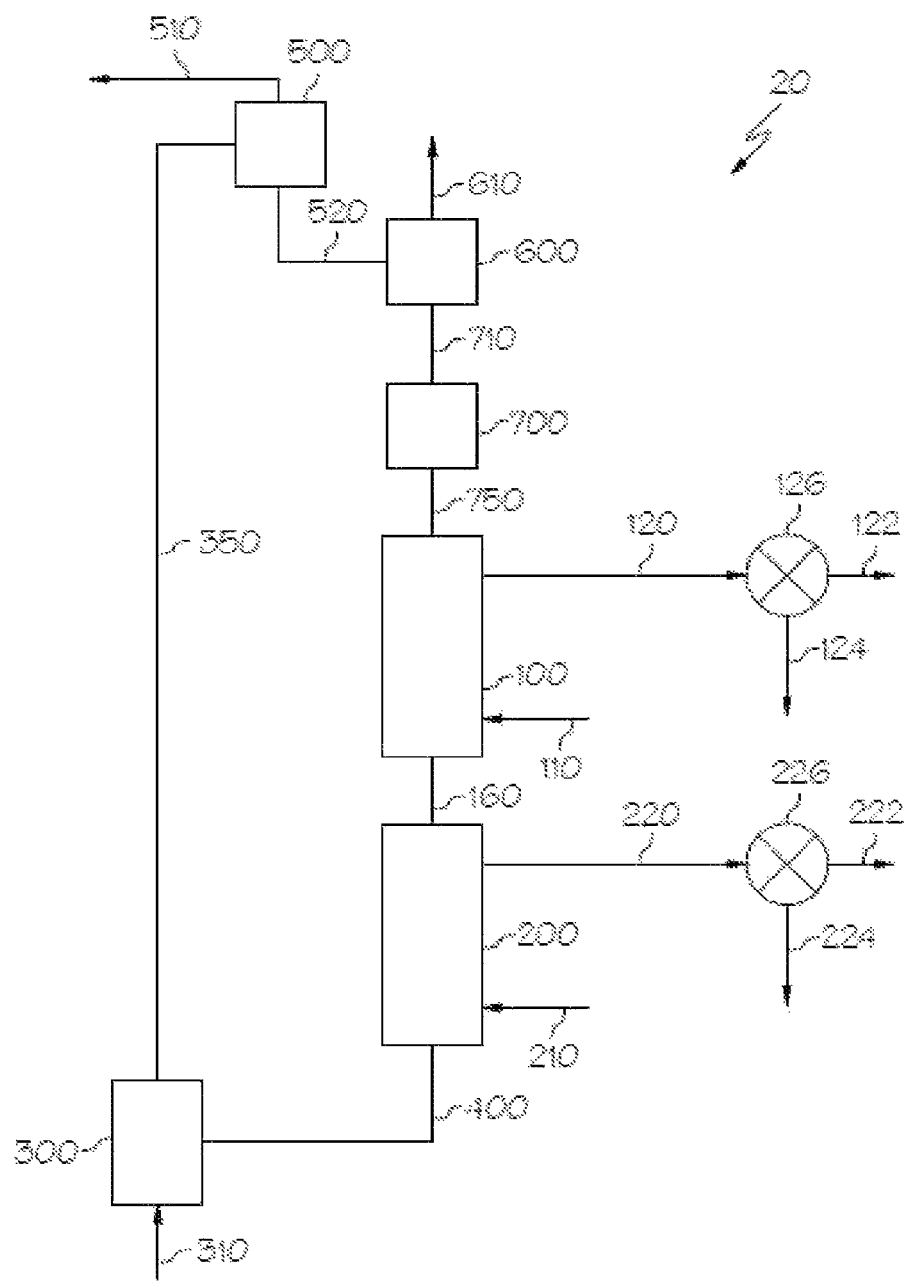
FIG. 2 is a schematic illustration of another system for converting fuel according to one or more embodiments of the present invention.

Now referring to FIG. 2, in another embodiment, $H_2$ and/or heat/power may be produced from solid carbonaceous fuels by a fuel conversion system 20 similar to the system 10 described in FIG. 1, but further comprising an oxidation reactor 200. The configuration of the reduction reactor 100 and other system components in this embodiment follows the similar configuration as the previous embodiment shown in FIG. 1. The system of FIG. 2 may convert carbonaceous fuels from the reduction reactor inlet stream 110 into a $CO_2/H_2O$ rich gas stream 120 using the oxygen carrying materials that contain iron oxide with a valence state of about 3+. In the reduction reactor 100, the iron in the oxygen carrying material may be reduced to an average valence state between about 0 and 2+ for the $H_2$ production. It should be understood that the operation and configuration of the system 20 comprising an oxidation reactor 200 (a three reactor system) is similar to the operation of the system 10 not comprising an oxidation reactor (a two reactor system), and like reference numbers in FIGS. 1 and 2 correspond to like system parts.

Similar to the system of FIG. 1, the $CO_2/H_2O$ rich gas in the outlet stream 120 of the system of FIG. 2 may be further separated by a condenser 126 to produce a $CO_2$ rich gas stream 122 and an $H_2O$ rich stream 124. The $CO_2$ rich gas stream 122 may be further compressed for sequestration. The reduction reactor 100 may be specially designed for solids and/or gas handling, which is discussed herein. In some embodiments, the reduction reactor 100 may be operated in as packed moving bed reactor. In another embodiment, the reduction reactor may be operated as a series of interconnected fluidized bed reactors, wherein oxygen carrying material may flow counter-currently with respect to a gaseous species.

The reduced oxygen carrying material exiting the reduction reactor 100 may be transferred, through a connection means 160, which may include a non-mechanical gas-sealing device 160, to an oxidation reactor 200. The reduced oxygen carrying materials may be re-oxidized with steam from an inlet stream 210. The oxidation reactor 200 may have an outlet stream 220 rich in $H_2$ and steam. Excessive/unconverted steam in the outlet stream 220 may be separated from the $H_2$ in the stream 220 with a condenser 226. An $H_2$ rich gas stream 222 and an $H_2O$ rich stream 224 may be generated. The steam inlet stream 210 of the oxidation reactor 200 may come from condensed steam recycled in the system 20 from an outlet stream 124 of the reduction reactor 100.

In one embodiment, a portion of the solid carbonaceous fuel in the reduction reactor 100 may be intentionally or unintentionally introduced to the oxidation reactor 200, which may result in a $H_2$, CO, and $CO_2$ containing gas in an outlet stream 220. Such a gas stream 220 can be either used directly as synthetic gas (syngas) or separated into various streams of pure products. In the oxidation reactor 200, the reduced oxygen carrying materials may be partially re-oxidized to an average valence state for iron that is between 0 and 3+. In some embodiments, the reduction reactor 100 is configured to operate in a packed moving bed mode or as a series of interconnected fluidized bed reactors, in which oxygen carrying material may flow counter-currently with respect to the gaseous species.

The oxidation reactor 200, which may comprise the same reactor type or a different reactor type than the reduction reactor 100, may be configured to oxidize the reduced metal or reduced metal oxide to produce a metal oxide intermediate. As used herein, "metal oxide intermediate" refers to a metal oxide having a higher oxidation state than the reduced metal or metal oxide, and a lower oxidation state than the metal oxide of the oxygen carrying material. For example, and not by way of limitation, the following equation illustrates possible oxidation reactions in the oxidation reactor 200:

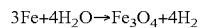

$$3Fe + 4H_2O \rightarrow Fe_3O_4 + 4H_2$$

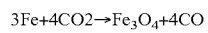

$$3Fe + 4CO_2 \rightarrow Fe_3O_4 + 4CO$$

In this example, oxidation in the oxidation reactor using steam may produce a resultant mixture that includes metal oxide intermediates comprising predominantly $Fe_3O_4$. $Fe_2O_3$ and FeO may also be present. Furthermore, although $H_2O$, specifically steam, is the oxidant in this example, numerous other oxidants are contemplated, for example, CO, $O_2$, air, and other oxidizing compositions.

The oxidation reactor 200 may be configured as a moving bed reactor, a series of fluidized bed reactors, a rotary kiln, a fixed bed reactor, combinations thereof, or others known to one of ordinary skill in the art. Typically, the oxidation reactor 200 may operate at a temperature in the range of about 400° C. to about 1200° C. and a pressure in the range of about 1 atm to about 150 atm; however, one of ordinary skill in the art would realize that temperatures and pressures outside these ranges may be desirable depending on the reaction mechanism and the components of the reaction mechanism.

The oxidation reactor 200 may also comprise a moving bed with a countercurrent contacting pattern of gas and solids. Steam may be introduced at the bottom of the reactor and may oxidize the reduced Fe containing particles as the particles move downwardly inside the oxidation reactor 200. In this embodiment, the product formed may be hydrogen, which is subsequently discharged from the top of the oxidation reactor 200. It will be shown in further embodiments that products such as CO and syngas are possible in addition to hydrogen. Though $Fe_2O_3$ formation is possible in the oxidation reactor 200, the solid product from this reactor may be mainly metal oxide intermediate, $Fe_3O_4$. The amount of $Fe_2O_3$ produced in the oxidation reactor 200 depends on the oxidant used, as well as the amount of oxidant fed to the oxidation reactor 200. The steam present in the hydrogen product of the oxidation reactor 200 may then be condensed in order to provide for a hydrogen rich stream. At least part of this hydrogen rich stream may be recycled back to the reduction reactor 100. In addition to utilizing the same reactor type as the reduction reactor 100, the oxidation reactor 200 may similarly operate at a temperature between about 400° C. to about 1200° C. and pressure of about 1 atm to about 150 atm.

Still referring to FIG. 2, the partially re-oxidized oxygen carrying materials exiting the oxidation reactor 200 may flow through a combustion reactor inlet stream 400 and may be transferred to a combustion reactor 300. The reduced oxygen carrying material in the combustion reactor inlet stream 400 may be moved through a non-mechanical gas seal and/or a non-mechanical solids flow rate control device.

The oxygen carrying material may enter the combustion reactor 300 and may be fluidized with air or another oxidizing gas from an inlet stream 310. The iron in the oxygen carrying material may be re-oxidized by air in the combustion reactor 300 to an average valence state of about 3+. The combustion reactor 300 may release heat during the oxidation of oxygen carrying material particles. Such heat may be extracted for steam and/or power generation or used to compensate the process heat requirements.

Followed by the oxidation reactions in the combustion reactor 300, the oxidized oxygen carrying materials may be transferred in the same manner as the previous embodiment in FIG. 1, such as through a solid conveying system 350 such as a riser, into a gas-solid separation device 500, to a solids separation device 600, and to solids storage vessel 700.

The reactors of the systems described herein may be constructed with various durable materials suitable to withstand temperatures of up at least 1200° C. The reactors may comprise carbon steel with a layer of refractory on the inside to minimize heat loss. This construction also allows the surface temperature of the reactor to be fairly low, thereby improving the creep resistance of the carbon steel. Other alloys suitable for the environments existing in various reactors may also be employed, especially if they are used as internal components configured to aid in solids flow or to enhance heat transfer within a moving bed embodiment. The interconnects for the various reactors can be of lock hopper design or rotary/star valve design to provide for a good seal. However, other interconnects as can be used.

Various mechanisms can be used for solid transportation in the numerous systems disclosed herein. For example, in some embodiments the solid transportations systems described herein may be transport systems using a pneumatic conveyor driven by air, belt conveyors, bucket elevators, screw conveyors, moving beds and fluidized bed reactors. The resultant depleted air stream may be separated from the particles and its high-grade-heat content recovered for steam production. After regeneration, the oxygen carrying material particle may not be substantially degraded and may maintain full particle functionality and activity.

Heat integration and heat recovery within the system and all system components may be desirable. Heat integration in the system is specifically focused on generating the steam for the steam requirements of the oxidation reactor 200. This steam may be generated using the high grade heat available in the hydrogen, $CO_2$ and depleted air streams exiting the various system reactors 100,200,300, respectively. In one embodiment of the processes described herein, substantially pure oxygen may be generated, in which part of the hydrogen may be utilized. The residence time in each reactor is dependent upon the size and composition of individual oxygen carrying material particles. For example, the residence time for a reactor comprising Fe based metal oxides may range from about 0.1 to about 20 hours.

In some embodiments, additional unwanted elements may be present in the system. Trace elements like Hg, As, Se are not expected to react with $Fe_2O_3$ at the high temperatures of the process. As a result they are expected to be present in the $CO_2$ stream produced. If $CO_2$ is to be used as a marketable product, these trace elements may be removed from the stream. Various cleanup units, such as mercury removal units are contemplated herein. Similar options will need to be exercised in case the $CO_2$ stream is let out into the atmosphere, depending upon the rules and regulations existing at that time. If it is decided to sequester the $CO_2$ for long term benign storage, e.g. in a deep geological formation, there may not be a need to remove these unwanted elements. Moreover, $CO_2$ may be sequestered via mineral sequestration, which may be more desirable than geological storage, because it may be safer and more manageable.

Furthermore, sulfur may constitute an unwanted element, which must be accounted for in the system. In a solid fuel conversion embodiment, sulfur, which is present in coal, is expected to react with $Fe_2O_3$ and form FeS. Some FeS may release $SO_2$ in the combustion reactor 300. This will be liberated on reaction with steam in the oxidation reactor 300 as $H_2S$ and will contaminate the hydrogen stream. During the condensation of water from this steam, most of this $H_2S$ will condense out. The remaining $H_2S$ can be removed using conventional techniques like amine scrubbing or high temperature removal using a Zn, Fe or a Cu based sorbent. Another method for removing sulfur may include the introduction of sorbents, for example, CaO, MgO, etc. Additionally, sorbents may be introduced into the reduction reactor 100 in order to remove the sulfur and to prevent its association with Fe. The sorbents may be removed from the system using ash separation device.

Although some embodiments of the present system are directed to producing hydrogen, it may be desirable for further treatment to produce ultra-high purity hydrogen. As would be familiar to one of ordinary skill in the art, some carbon or its derivatives may carry over from the reduction reactor 100 to the oxidation reactor 200 and contaminate the hydrogen stream. Depending upon the purity of the hydrogen required, it may be desirable to use a pressure swing adsorption (PSA) unit for hydrogen to achieve ultra high purities. The off gas from the PSA unit may comprise value as a fuel and may be recycled into the reduction reactor 100 along with coal, in solid fuel conversion embodiments, in order to improve the efficiency of hydrogen production in the system.

Further details regarding the operation of fuel conversion systems are described in Thomas (U.S. Pat. No. 7,767,191), Fan (PCT/US10/48125), Fan (WO 2010/037011), and Fan (WO 2007/082089), all of which are incorporated herein by reference in their entirety.

The oxygen carrying material for use in a chemical looping system may comprise a ceramic framework. The ceramic framework may comprise a primary active mass and a support material. The support material may comprise a primary support material. In some embodiments, the support material may further comprise a secondary support material. Without being bound by theory, it is believed that the support material enhances the longevity of the oxygen carrying material by providing stable reactivity and increased strength. In one embodiment, the oxygen carrying material contains between about 10% to about 100% by weight of the ceramic framework. In another embodiment, the oxygen carrying material contains between about 40% to about 100% by weight of the ceramic framework. In another embodiment, the oxygen carrying material contains about 100% ceramic framework, wherein the oxygen carrying material does not substantially contain any materials other than the ceramic framework.

In a fuel conversion system, such as those depicted in FIGS. 1 and 2, the active mass may serve to donate oxygen to the fuel for its conversion. It also may accept the oxygen from air/steam to replenish the oxygen lost. In one embodiment, the primary active mass may comprise a metal or metal oxide of Fe, Co, Ni, Cu, Mo, Mn, Sn, Ru, Rh, or a combination thereof. In another embodiment, the primary active mass may comprise a metal or metal oxide of Fe, Cu, Ni, Mn, or combinations thereof. In yet another embodiment, the primary active mass may comprise a metal or metal oxide of Fe, Cu, or combinations thereof. In one embodiment, the oxygen carrying material contains between about 20% and about 70% by mass of the active mass material. In yet another embodiment, the oxygen carrying material contains between about 30% and about 65% by mass of the active mass material.

In one embodiment, the oxygen carrying material may comprise a primary support material. Without being bound by theory, it is believed that in the ceramic framework, the support part of the oxygen carrying material, serves to provide strength to the particle and may help retain the reactivity of the oxygen carrying material. In one embodiment, the primary support material may comprise a metal, metal oxide, metal carbides, metal nitrates, or metal halides of Li, Be, B, Na, Mg, Al, Si, K, Ca, Sc, Ti, V, Cr, Mn, Co, Zn, Ga, Ge, Rb, Sr, Y, Zr, Nb, Mo, Cd, In, Sn, Sb, Cs, Ba, La, Ce, Th. In another embodiment, the primary support material may comprise a ceramic or clay material such as, but not limited to, aluminates, aluminum silicates, aluminum phyllosilicates, silicates, diatomaceous earth, sepiolite, kaolin, bentonite, and combinations thereof. In yet another embodiment, the primary support material may comprise an alkali or alkine earth metal salt of a ceramic or clay material. In yet another embodiment, the primary support material may comprise a naturally occurring ore, such as, but not limited to, hematite, illmenite, or wustite. In one embodiment, the oxygen carrying material contains between about 5% and about 70% by mass of the primary support material. In another embodiment, the oxygen carrying material contains between about 30% and about 60% by mass of the primary support material.

In one embodiment, the oxygen carrying material may comprise a secondary support material in addition to a primary support material. Without being bound by theory, it is believed that the addition of the secondary support material in the ceramic framework facilitates improved reactivity and strength of the oxygen carrying material. In one embodiment, the oxygen carrying material contains between about 1% and about 35% of the secondary support material. In one embodiment, the secondary support material may comprise a metal, metal oxide, metal carbides, metal nitrates, or metal halides of Li, Be, B, Na, Mg, Al, Si, K, Ca, Sc, Ti, V, Cr, Mn, Co, Zn, Ga, Ge, Rb, Sr, Y, Zr, Nb, Mo, Cd, In, Sn, Sb, Cs, Ba, La, Ce, Th. In another embodiment, the secondary support material may comprise a ceramic or clay material such as, but not limited to, aluminates, aluminum silicates, aluminum phyllosilicates, silicates, diatomaceous earth, sepiolite, kaolin, bentonite, and combinations thereof. In yet another embodiment, the secondary support material may comprise an alkali or alkine earth metal salt of a ceramic or clay material. In yet another embodiment, the secondary support material may comprise a naturally occurring ore, such as, but not limited to, hematite, illmenite, or wustite.

Figure 3:
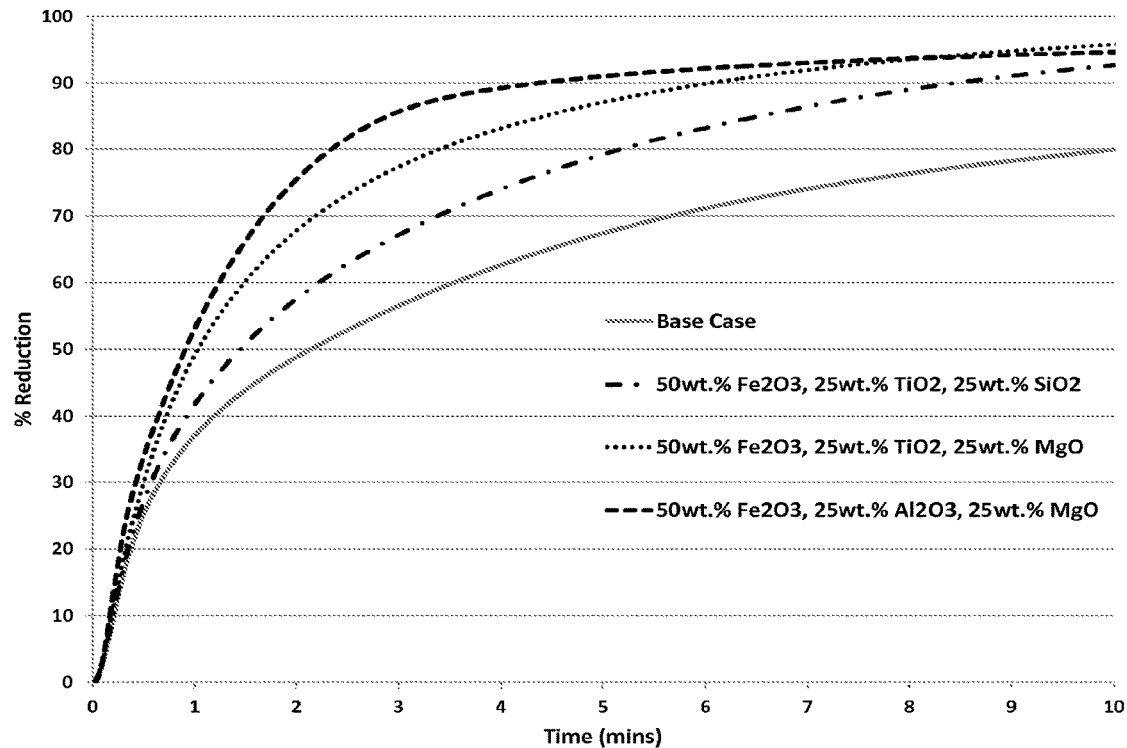
FIG. 3 is a chart that shows the enhanced reactivity of oxygen carrying materials according to one or more embodiments of the present invention.

The oxygen carrying materials disclosed herein may display enhanced reactivity, recyclability, and strength. By way of comparison, some embodiments of oxygen carrying materials disclosed herein are compared with a "base case" oxygen carrying material that comprises 60 wt % $Fe_2O_3$ and 40 wt % $TiO_2$ (without a secondary support). FIG. 3 shows the enhanced reduction reactivity, based on the percentage of reduction, of secondary supported oxygen carriers containing 50 wt % $Fe_2O_3$, 25 wt % primary support material and 25 wt % secondary support material compared to the base case oxygen carrying material. The data in FIG. 3 was produced from an experiment wherein the reducing gas was 100 ml/min of $H_2$ that was contacted with the oxygen carrying material at about 900° C. under atmospheric conditions.

In one embodiment, the oxygen carrying material comprising a secondary support becomes mechanically stronger when exposed about 10 redox cycles. The mechanical strength is measured by using the process similar to the ASTM D4179 standard test method for single pellet crush strength of formed catalysts and catalyst carriers. The oxygen carrier pellets are placed between the crushing surface and a force gauge is used to measure the force required to crush the sample. The secondary supported oxygen that showed improved reduction reactivity also showed increased strength, as shown in Table 1.

TABLE 1

| Oxygen Carrier Candidate | Fresh carrier strength (N) | Post 10-cycles strength (N) | Change in Strength (%) |
|---|---|---|---|
| Base Case | 63.64 | 58.04 | −8.8 |
| 50 wt % Fe2O3, 25 wt % TiO2, 25 wt % SiO2 | 68.28 | 126.8 | 85.71 |
| 50 wt % Fe2O3, 25 wt % TiO2, 25 wt % MgO | 51.4 | 116.66 | 126.96 |
| 50 wt % Fe2O3, 25 wt % Al2O3, 25 wt % MgO | 33.28 | 76.66 | 130.35 |

Figure 4:
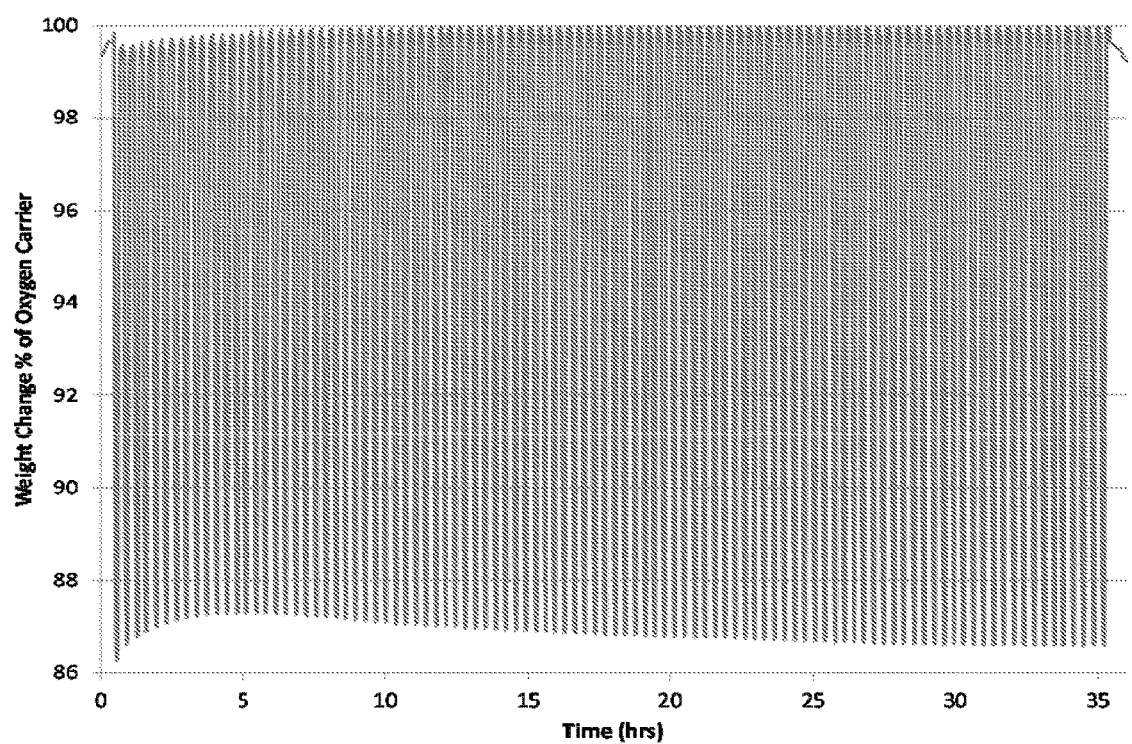
FIG. 4 is a chart that shows the weight change percent over 100 redox cycles of oxygen carrying materials according to one or more embodiments of the present invention.

FIG. 4 shows the weight change percent of a secondary supported oxygen carrying material over 100 redox cycles, corresponding to the reactivity of the oxygen carrying material in a redox cycle. In one embodiment, the oxygen carrying material of FIG. 4 comprises 50wt % Fe2O3, 40 wt % TiO2 and 10 wt % MgO and does not lose more than about 5% of its carrying capacity when exposed to about 100 redox cycles. In one embodiment, the physical stability of the a secondary supported oxygen carrying material improves over redox cycles compared to a non secondary supported oxygen carrying material. For example, an oxygen carrying material comprising 50 wt % $Fe_2O_3$, 40 wt % $TiO_2$ and 10 wt % MgO had its strength improved about 65% over the base case oxygen carrying material over 50 redox cycles, and improved about 58% over the 100 redox cycles.

Without being limited by theory, it is believed that the improved physical stability of the secondary supported oxygen carriers may be associated with the volume expansion control. The redox performance of the oxygen carriers may result in the migration of the active metal phase. The reduction of iron oxide may cause a change in density in the oxygen carrying material and the oxygen migration may be controlled by the outward diffusion of iron ions. Therefore the denser iron grain center is shifted from its original location. The oxidation causes the volume to increase due to addition of mass. This continuous outward movement of the grain results in volume expansion. The volume expansion may cause the oxygen carrying material to become weaker. The addition of the primary support may assist to disperse the active metal phase and may prevent agglomeration of the iron phase and prevents deactivation. However, the volume expansion cannot be avoided. The secondary support material may serve to reduce the volume expansion rate by forming solid phase stabilizers that prevent the migration of iron to the surface.

In one embodiment, in addition to the ceramic framework, the oxygen carrying material may comprise a binder material. The addition of a binder material may increase the strength of the oxygen carrying material without substantial loss in reactivity. A ceramic/clay material may be used as a binder material. The binder material may help to increase the strength of the particle and may be inert under reactive conditions. In one embodiment, the oxygen carrying material contains between about 0.05 wt % and about 20 wt % by mass of the binder material. An Alkali or Alkaline earth metal salt may be used as a binding material to improve the physical integrity of a metal oxide in the ceramic framework. In one embodiment, the binding material may include bentonite, sodium silicate, potassium silicate, sepiolite, kaolin, or combination thereof.

Figure 5:
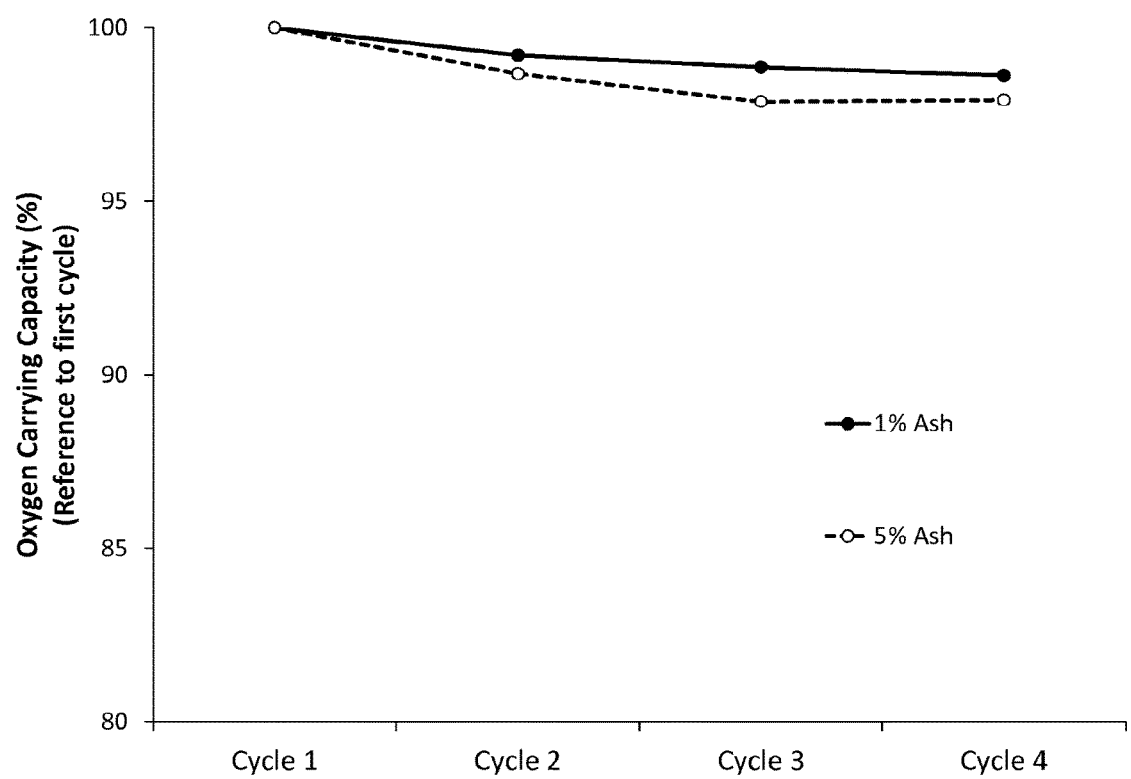
FIG. 5 is a chart that shows the oxygen carrying capacity of oxygen carrying materials comprising ash according to one or more embodiments of the present invention.

In one embodiment, the oxygen carrying material may comprise ash. The ash may be derived from coal usage to maintain or improve the reactivity over multiple cycles. The presence of ash in the some fuel conversion systems may be unavoidable due to the direct introduction of coal/biomass into the reactor system. The ash is removed from the system along with the oxygen carrying material fines. The ash may be used in the oxygen carrying material as an inert material. The ash may comprise between about 0% and about 25% of the mass of the oxygen carrying material. The heterogeneous oxygen carrying material mixture containing the ceramic framework and ash may be prepared through one of the following synthesis techniques: mechanical mixing, slurry mixing, impregnation, sol-gel, co-precipitation, solution combustion. The presence of ash did not indicate any substantial detrimental effect on the particle reactivity and recyclability. An oxygen carrying material comprising of the base case of 60 wt % Fe2O3 and 40 wt % TiO2 and containing varying amounts of ash was found to be reactive and recyclable, as shown in FIG. 5.

The novel oxygen carrying materials described in this invention disclosure are capable of maintaining stable oxygen donation capacity at temperature range from 600° C. to 1250° C. In a preferred embodiment, the oxygen carrying material is made to undergo reduction and oxidation cycles between temperatures ranging from 700° C. to 1250° C. In a more preferred embodiment, the oxygen carrying capacity is utilized in the temperature range of 750° C. to 1050° C.

In one embodiment, in the ceramic framework, the use of multiple metal oxides as the primary active mass. The incorporation of multiple metal oxides as the primary active mass may bring unique benefits in chemical looping applications. Two or more primary and/or support metal cations and oxygen anion may form perovskite ($ABO_{3-\delta}$) type of structure to achieve good oxygen anion conductivity and/or good structural stability. The preferred A site metal cations include the cations of Ca, Mg, Sr, Ba, Latium metals, and combinations thereof, the preferred B site metal cations include the cations of Ti, Al, Fe, Si, Mn, Co, and combination thereof. In one embodiment, iron is used as the B site metal and the molar ratio between iron and the total B site metal ranges between about 0.1 and about 1. In another embodiment, the aforementioned perovskite material is combined with a simple primary metal oxides and/or supports to achieve a heterogeneous metal oxide mixture through one of the following synthesis techniques: mechanical mixing, slurry mixing, impregnation, sol-gel, co-precipitation, solution combustion. The heterogeneous mixture of the perovskite, primary metal oxide, and/or support can take the advantage of the high oxygen conductivity of perovskite, oxygen capacity of primary metal oxide, and structural and thermal stability of the support.

In another embodiment, two or more primary and/or support metal cations and oxygen anion form spinel or inverse spinel ($AB_2O_{4-\delta}$) type of structure to achieve good structural stability and good reactivity. The preferred A site cations include the cations of Ca, Mg, Fe, Cu, Mn, Ni, Co, Cr, Ba, Sr, Zn, Cd, Ag, Au, Mo and combinations thereof, the preferred B site cations include the cations of Fe, Al, Mn, Cr, Si, B, Cr, Mo and combination thereof. Under a preferred embodiment, iron is used as the B site metal and the molar ratio between iron and the total A and B site metals ranges between 0.1 and 1. Under another preferred embodiment, the aforementioned spinel/anti-spinel material is combined with a simple primary metal oxides and/or supports to achieve a heterogeneous metal oxide mixture through one of the following synthesis techniques: mechanical mixing, slurry mixing, impregnation, sol-gel, co-precipitation, solution combustion.

In yet another embodiment, a heterogeneous metal oxide mixture consisting of one or more of the following primary oxygen donors: oxides of copper, manganese, nickel, cobalt, iron, and the aforementioned perovskite and spinel/anti-spinel materials is prepared using one of the following synthesis techniques: mechanical mixing, slurry mixing, impregnation, sol-gel, co-precipitation, solution combustion. Under a preferred embodiment, the mixture contains at least 10% (wt.) oxides of iron and one or more of the following metal oxides: oxides of copper, nickel, manganese, and cobalt. One embodiment containing the active phase comprised of the mixtures of the oxides of iron and copper displayed stable reactivity over multiple cycles.

In yet another embodiment, one or more of the members of alkali and Group III elements are added to the complex metal oxides to enhance the strength and reactivity of the aforementioned metal oxides. In a preferred embodiment, Li, Na, K, B, or combinations thereof is used.

In another embodiment, the oxygen carrying material may be used in combination with a promoter. The oxygen carrying material disclosed herein may comprise promoters such as, but not limited to, mixed metals, metal oxides, metal nitrites, metal halides, metal carbides, or combinations thereof as promoters to increase reactivity and strength. A promoter may improve methane conversion to CO2 and H2O. The addition of certain promoters may significantly improve the oxygen carrying material performance. Small quantities of promoter material incorporated into the oxygen carrying material can help improve the kinetic reaction rates between the oxygen carrying material and the reactive gases. The preferred weight % of the promoters introduced into the oxygen carrying material ranges between about 0.01% to about 10%. In one embodiment, the promoters are introduced into the oxygen carrying materials after the synthesis of the oxygen carrying material by using the impregnation techniques like wet-impregnation, dry impregnation or incipient wet impregnation method. In another embodiment, the promoters are introduced into the oxygen carrying material during the synthesis of the heterogeneous oxygen carrying material mixture containing the ceramic framework prepared by one of the following synthesis techniques:

mechanical mixing, slurry mixing, impregnation, sol-gel, co-precipitation, solution combustion.

Figure 6:
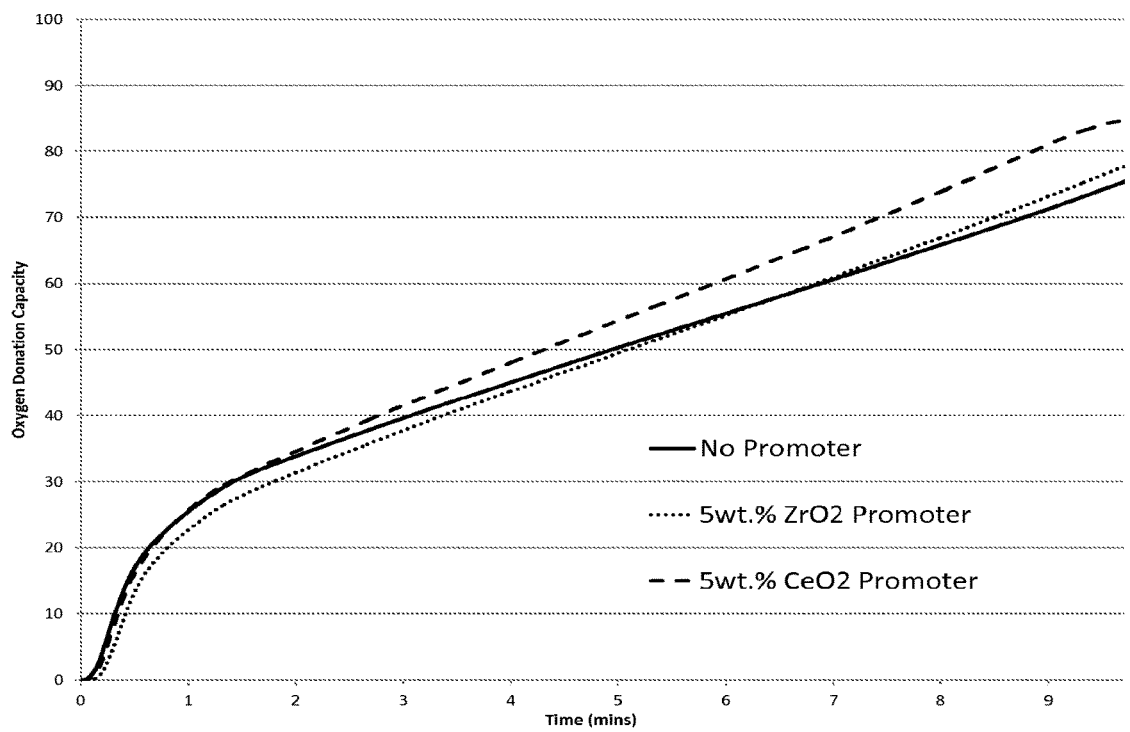
FIG. 6 is a chart that shows the oxygen carrying capacity of oxygen carrying materials comprising a promoter according to one or more embodiments of the present invention.

The oxidation of methane into $CO_2$ and water occurs at a slower rate compared to the oxidation of other gaseous fuels like $H_2$ and CO. This makes improving the reactivity of the oxygen carrying material with methane a useful strategy to maintain lower residence time required in the reactors. The promoters selected for this purpose can be pure metal, oxides, nitrates or halides of the Lanthanide series elements, group IIIB, IVB, VB, VTB elements or a combination thereof. In one embodiment, the addition of dopants improved the methane oxidation rates of the oxygen carrying material, as shown in FIG. 6. The data of FIG. 6 was produced from an experiment wherin CH4 at 100 ml/min was contacted with the oxygen carrying material at about 900° C. In one embodiment, the dopants that may be oxides of ceria and/or zirconia.

The reduction rate of the oxygen carrying materials may play a direct role on the oxygen carrying material residence time in the reducer reactor. Faster rates may result in improved cost benefits for the process. The promoters selected for this purpose can be pure metal, oxides, nitrates or halides of the Ni, Cu, Mn, Cr, Zr, Mo, Ag, Au, Zn, Sn, Pt, Ru, Rh, Re or a combination thereof. In one such preferred embodiment, the addition of Nickel oxides in small quantities resulted in faster reduction rates of the oxygen carrying materials with reducing gases.

The air oxidation rate of the oxygen carrying materials may play a direct role on the combustor reactor size. The higher rates may result in improved cost benefits for the process. The promoters selected for this purpose may be a pure metal, oxides, nitrates or halides of the Lanthanide and Actinide series elements, group IA, IIA, IIIA, IVA elements or a combination thereof. In one embodiment, the addition of dopants in small quantities reduced the time taken to achieve complete oxidation with air from 30 minutes to less than 10 minutes. The dopants may be oxides of lithium and boron and combinations thereof. In one embodiment, the addition of 5 wt % $LiBO_2$ to the secondary supported oxygen carrier comprising of 50 wt % Fe2O3, 40 wt % TiO2 and 10 wt % MgO resulted in the reduction of time required for complete oxidation from 30 minutes to 26 minutes. In another embodiment, the addition of 10 wt % $LiBO_2$ to the secondary supported oxygen carrier comprising of 50 wt % Fe2O3, 40 wt % TiO2 and 10 wt % MgO resulted in complete oxidation within 6 minutes.

The reactivity and recyclability of the oxygen carrying material may not be compromised by the addition of small quantities of promoters. For example, a pellet with boron oxide as the promoter may not deteriorate the recyclability of the oxygen carrying material. In one embodiment, substantially no loss in reactivity is observed over 42 cycles with an oxygen carrier comprised of 50 wt % Fe2O3, 40 wt % TiO2 and 10 wt % MgO mixed with 5 wt % of $B_2O_3$.

In one embodiment, the oxygen carrying material may be synthesized by making the ceramic framework that comprises the active metal/metals, primary support material and secondary support material, and the remaining additional material into a well-mixed matrix prepared by one of the following synthesis techniques: mechanical mixing, slurry mixing, impregnation, sol-gel, co-precipitation, solution combustion. The result of such action is a homogenous powder mixture.

The homogenous powder mixture may then be processed to arrive at the final oxygen carrying material. The post mixture formation processing involves multiple steps. The first step, if required, is drying at temperatures in the range from about 50° C. to about 450° C. for a given time period that ranges between about 1 to about 14 hours.

The mixture may then be modified to the given particle size range of about 0.5 mm to about 7 mm in diameter using particle formation techniques such as, but not limited to, pelletization, extrusion, or granulation. To facilitate the smoother modification of the mixture into the given size, certain other materials may be added to the homogenous mix. The special material that is added can be a binder material such as clay, ceramics, starch, glucose, sucrose or a combination thereof. They can also be lubricant materials such as, but not limited to magnesium stearate, licowax, and combinations thereof. The formed pellet may then be introduced to the sintering step.

The sintering of the pellets may result in increase in strength of the oxygen carrying materials which is crucial for longevity of operation of the chemical looping systems. The pellets are sintered at temperatures in the range of about 450° C. to about 1300° C. for extended time periods in the range of about 1 to about 48 hours.

The fines generated from the chemical looping unit due to attrition may be re-used to make the oxygen carrying material. In this embodiment, the fines may be mixed with the fresh oxygen carrying material mixture synthesized using techniques such as, but not limited to, mechanical mixing, slurry mixing, impregnation, sol-gel, co-precipitation, solution combustion. This mixture of fines and fresh particles may be calcined together to form stronger particles. The weight % of fines in the mixture may range between about 0-100%. The oxygen carrying material made from 100% fines was found to be reactive and recyclable with substantially no deterioration of reactivity after about 5 redox cycles. The oxygen carrying material made from 100% fines were also up to 34% stronger than a fresh oxygen carrying material synthesized from chemical grade raw materials.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims. More specifically, although some aspects of the present disclosure are identified herein as preferred or particularly advantageous, it is contemplated that the present disclosure is not necessarily limited to these aspects.

The invention claimed is:

1. An oxygen carrying material comprising:
   20% to 70% by weight of a primary active mass, the primary active mass comprising a composition having a metal or metal oxide selected from the group consisting of Fe, Co, Ni, Cu, Mo, Mn, Sn, Ru, Rh, and combinations thereof;
   5% to 70% by weight of a primary support material, the primary support material comprising a composition having:
      (i) at least one metal, metal oxide, metal carbide, metal nitrate, metal halide, or combinations thereof, wherein the at least one metal, metal oxide, metal carbide, metal nitrate, or metal halide comprise metal elements selected from the group consisting of Li, Be, B, Na, Mg, Al, Si, K, Ca, Sc, Ti, V, Cr, Mn, Co, Zn, Ga, Ge, Rb, Sr, Y, Zr, Nb, Mo, Cd, In, Sn, Sb, Cs, Ba, La, Ce, Th, and combinations thereof;
      (ii) at least one ceramic or clay material, or salts thereof;
      (iii) at least one naturally occurring ore; or
      (iv) combinations thereof; and
   1% to 35% by mass of a secondary support material, the secondary support material comprises a composition having:
      (i) at least one metal, metal oxide, metal carbide, metal nitrate, metal halide, or combinations thereof, wherein the at least one metal, metal oxide, metal carbide, metal nitrate, or metal halide comprise metal elements selected from the group consisting of Li, Be, B, Na, Mg, Al, Si, K, Ca, Sc, Ti, V, Cr, Mn, Co, Zn, Ga, Ge, Rb, Sr, Y, Zr, Nb, Mo, Cd, In, Sn, Sb, Cs, Ba, La, Ce, Th, and combinations thereof;
      (ii) at least one ceramic or clay material or salts thereof;
      (iii) at least one naturally occurring ore; or
      (iv) combinations thereof;
   wherein the primary support material composition and the secondary support material composition are different.

2. The oxygen carrying material of claim 1, wherein the oxygen carrying material contains between 30% and 65% by mass of the primary active mass, the oxygen carrying material contains between 30% and 60% by mass of the primary support material, and the oxygen carrying material contains between 5% and 25% by mass of the secondary support material.

3. The oxygen carrying material of claim 1, wherein the primary active mass comprises an oxide of Fe.

4. The oxygen carrying material of claim 1, wherein the primary support material comprises an oxide of Ti.

5. The oxygen carrying material of claim 1, wherein the secondary support material comprises an oxide of Mg.

6. The oxygen carrying material of claim 1, wherein the oxygen carrying material further comprises a binder material.

7. The oxygen carrying material of claim 1, wherein the oxygen carrying material further comprises ash.

8. The oxygen carrying material of claim 1, wherein the oxygen carrying material further comprises a promoter.

9. The oxygen carrying material of claim 8, wherein the promoter comprises mixed metals, metal oxides, metal nitrites, metal halides, metal carbides, or combinations thereof.

10. The oxygen carrying material of claim 1, wherein the oxygen carrying material is formed into particles and substantially all of the particles have a diameter between 0.5 mm and 7 mm.

11. The oxygen carrying material of claim 1, wherein the primary active mass comprises at least two different metal oxides selected from the group comprising metal oxides of Fe, Co, Ni, Cu, Mo, Mn, Sn, Ru, Rh.

12. The oxygen carrying material of claim 1, wherein the oxygen carrying material does not lose more than 5% of its carrying capacity when exposed to 100 redox cycles.

13. The oxygen carrying material of claim 1, wherein the oxygen carrying material becomes mechanically stronger when exposed about 10 redox cycles.

14. The oxygen carrying material of claim 1, wherein the primary active mass comprises an oxide of Fe, the primary support material comprises an oxide of Ti, the oxygen carrying material contains between 30% and 65% by mass of the primary active mass, the oxygen carrying material contains between 30% and 60% by mass of the primary support material, and the oxygen carrying material contains between 5% and 25% by mass of the secondary support material.

15. A system for converting fuel comprising:
   an oxygen carrying material of claim 1;
   a first reactor comprising a moving bed and an inlet for providing fuel to the first reactor, wherein the first reactor is configured to reduce the oxygen carrying material with the fuel to produce a reduced oxygen carrying material; and
   a second reactor communicating with the first reactor and an oxygen source, wherein the second reactor is configured to regenerate the oxygen carrying material by oxidizing the oxygen carrying material.

16. The system for converting fuel of claim 15, wherein the oxygen carrying material does not lose more than about 5% of its carrying capacity when exposed to about 100 redox cycles.

17. The system for converting fuel of claim of claim 15, further comprising a third reactor, wherein the third reactor is situated between the first reactor and the second reactor and in communicating with the first reactor and the second reactor, and is configured to oxidize at least a portion of the reduced oxygen carrying material from said first reactor to produce an oxygen carrying material intermediate and hydrogen.

18. A method for synthesizing oxygen carrying material of claim 1 comprising:
   forming a matrix comprising a primary active mass, a primary support, and a secondary support;
   drying the matrix; and
   forming the matrix into particles of the oxygen.

* * * * *

UNITED STATES PATENT AND TRADEMARK OFFICE
CERTIFICATE OF CORRECTION

PATENT NO. : 10,502,414 B2
APPLICATION NO. : 15/685951
DATED : December 10, 2019
INVENTOR(S) : Liang-Shih Fan, Deepak Sridhar and Fanxing Li It is certified that error appears in the above-identified patent and that said Letters Patent is hereby corrected as shown below:

In the Specification

Column 1, Line 13, please insert the following paragraph:
-- STATEMENT OF GOVERNMENT INTEREST
This invention was made with government support under grant number DE-NT0005289 awarded by the Department of Energy. The government has certain rights in the invention. --

Signed and Sealed this
Eleventh Day of August, 2020

Andrei Iancu
*Director of the United States Patent and Trademark Office*